(12) United States Patent
Berbee et al.

(10) Patent No.: US 10,730,977 B2
(45) Date of Patent: Aug. 4, 2020

(54) PROCESS TO MAKE TUBULAR ETHYLENE BASED POLYMERS WITH HIGH G' AND BROAD MWD

(71) Applicant: Dow Global Technologies LLC, Midland, MI (US)

(72) Inventors: Otto J. Berbee, Terneuzen (NL); Stefan Hinrichs, Terneuzen (NL); Sean W. Ewart, Freeport, TX (US); John O. Osby, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 295 days.

(21) Appl. No.: 15/736,921

(22) PCT Filed: Jun. 23, 2016

(86) PCT No.: PCT/US2016/039061
§ 371 (c)(1),
(2) Date: Dec. 15, 2017

(87) PCT Pub. No.: WO2016/210160
PCT Pub. Date: Dec. 29, 2016

(65) Prior Publication Data
US 2018/0171047 A1    Jun. 21, 2018

Related U.S. Application Data

(60) Provisional application No. 62/184,549, filed on Jun. 25, 2015.

(51) Int. Cl.
*C08F 210/02*    (2006.01)
*C08F 2/01*    (2006.01)
(Continued)

(52) U.S. Cl.
CPC ............ *C08F 210/02* (2013.01); *C08F 2/001* (2013.01); *C08F 2/01* (2013.01); *C08F 2/38* (2013.01);
(Continued)

(58) Field of Classification Search
None
See application file for complete search history.

(56) References Cited

U.S. PATENT DOCUMENTS 3,334,081 A    8/1967    Madgwick et al.
3,654,253 A    4/1972    Steigerwald et al.
(Continued)

FOREIGN PATENT DOCUMENTS

DE    276598 A3    3/1990
WO    97/45465 A1    12/1997

OTHER PUBLICATIONS

Goto, Journal of Applied Polymer Science, Applied Polymer Symposium, vol. 36, Jan. 1, 1981, pp. 21-40.

*Primary Examiner* — Satya B Sastri
(74) *Attorney, Agent, or Firm* — Quarles & Brady LLP

(57) ABSTRACT

A process to form an ethylene-based polymer comprises polymerizing a reaction mixture comprising ethylene, at least one symmetrical polyene and at least one chain transfer agent system comprising at least one chain transfer agent (CTA) in the presence of at least one free-radical initiator and in a reactor configuration comprising at least two reaction zones, reaction zone 1 and reaction zone i (i≥2), wherein reaction zone i is downstream from reaction zone 1. The ratio of "the activity of the CTA system of the feed to the first reaction zone" to the "activity of the CTA system of the cumulative feed to the reaction zone i," ($Z_1/Z_i$), is less than or equal to (0.8–0.2*log(Cs)), wherein Cs is from 0.0001 to 10.

14 Claims, 4 Drawing Sheets

(51) Int. Cl.
*C08F 2/38* (2006.01)
*C08F 10/02* (2006.01)
*C08F 2/00* (2006.01)
*C08K 5/07* (2006.01)
*C08K 5/101* (2006.01)
*C08F 210/16* (2006.01)

(52) U.S. Cl.
CPC ............. *C08F 10/02* (2013.01); *C08K 5/07* (2013.01); *C08K 5/101* (2013.01); *C08F 210/16* (2013.01); *C08F 2500/04* (2013.01); *C08F 2500/11* (2013.01); *C08L 2207/066* (2013.01); *Y02P 20/582* (2015.11)

(56) References Cited

U.S. PATENT DOCUMENTS

| | | | |
|---|---|---|---|
| 3,917,577 | A | 11/1975 | Trieschmann et al. |
| 4,916,255 | A | 4/1990 | Kobayashi et al. |
| 5,539,075 | A | 7/1996 | Gustafsson et al. |
| 6,569,962 | B1 | 5/2003 | Zschoch et al. |
| 7,582,709 | B2 * | 9/2009 | Goossens ............ B01J 19/2415 526/64 |
| 7,820,776 | B2 | 10/2010 | Neuteboom et al. |
| 9,718,906 | B2 * | 8/2017 | Berbee ................. C08F 210/02 |
| 2002/0052455 | A1 | 5/2002 | Hogt et al. |
| 2003/0114607 | A1 | 6/2003 | Donck |
| 2004/0214971 | A1 | 10/2004 | Gonioukh et al. |
| 2008/0242809 | A1 * | 10/2008 | Neuteboom ......... C08F 210/02 526/64 |
| 2009/0234082 | A1 | 9/2009 | Neilen et al. |
| 2010/0060244 | A1 | 3/2010 | Kurokawa et al. |
| 2011/0052525 | A1 | 3/2011 | Grunewald et al. |
| 2012/0059469 | A1 | 3/2012 | Myers et al. |
| 2013/0197168 | A1 | 8/2013 | Berbee et al. |
| 2013/0237678 | A1 * | 9/2013 | Osby ..................... C08F 210/02 526/298 |
| 2013/0295289 | A1 | 11/2013 | Littmann et al. |
| 2013/0333832 | A1 | 12/2013 | Vittorias et al. |
| 2014/0275427 | A1 | 9/2014 | Nummila-Pakarinen et al. |
| 2014/0288257 | A1 | 9/2014 | Zschoch et al. |
| 2014/0316094 | A1 | 10/2014 | Berbee et al. |
| 2014/0316096 | A1 | 10/2014 | Berbee et al. |
| 2015/0031843 | A1 | 1/2015 | Hjertberg et al. |
| 2015/0038655 | A1 * | 2/2015 | Magnusson .......... C08F 210/02 526/64 |
| 2015/0073104 | A1 | 3/2015 | Uematsu et al. |
| 2015/0111053 | A1 | 4/2015 | Nummila-Pakarinen et al. |
| 2015/0133616 | A1 | 5/2015 | Sultan et al. |
| 2015/0197590 | A1 | 7/2015 | Osby |
| 2015/0210785 | A1 | 7/2015 | Nummila-Pakarinen et al. |
| 2015/0274856 | A1 | 10/2015 | Berbee et al. |
| 2015/0344599 | A1 | 12/2015 | Osby et al. |
| 2016/0115256 | A1 | 4/2016 | Berbee et al. |
| 2016/0137822 | A1 | 5/2016 | Den Doelder et al. |
| 2017/0166668 | A1 | 6/2017 | Duchateau et al. |

* cited by examiner

PROCESS TO MAKE TUBULAR ETHYLENE BASED POLYMERS WITH HIGH G' AND BROAD MWD

REFERENCE TO RELATED APPLICATIONS

The present application claims the benefit of U.S. Provisional Application No. 62/184,549, filed on Jun. 25, 2015, and incorporated herein by reference.

BACKGROUND

Conventional low density polyethylene (LDPE) has good processability, but when used in film and/or extrusion coating applications, increased melt strength and higher G' performance is still desired. U.S. Pub. No. 2008/0242809 discloses a process for preparing an ethylene copolymer in a tubular reactor at a peak temperature of 290° C.-350° C. The comonomer is a di- or higher functional (meth)acrylate WO 2007/110127 discloses an extrusion coating composition comprising an ethylene copolymer polymerized in a tubular reactor at a peak temperature of 300-350° C. The comonomer is a bifunctional α, ω-alkadiene. WO97/45465 discloses an unsaturated ethylene copolymer, method for producing it, and its use for producing crosslinked structures. The unsaturated ethylene copolymer comprises a polymer, obtained by radical polymerization through a high-pressure process, of ethylene, and at least one monomer that is copolymerizable with ethylene and includes a diunsaturated comonomer of the formula (I) H2C=CH—O—R—CH=CH2, where R=—(CH2)m-O—, —(CH2CH2O)n-, or —CH2-C6H10-CH2-O—, m=2-10, and n=1-5. Preferably, this comonomer is 1,4-butanediol divinyl ether. WO2014/003837 discloses an ethylene-based polymer made by reacting ethylene and at least one asymmetrical polyene having an "alpha, beta unsaturated end" and a "C=C double bond end" in the presence of a free-radical initiator. The impact of the above-described multifunctional components on the final polymer through coupling and/or branching reactions is complex, and depends on the type and reactivity of the functional groups. A vinyl functional group will act as a comonomer and incorporate into a polymer chain/molecule. Chain Transfer Agent (CTA) functionality will either start the formation of a new polymer molecule, or initiate, after incorporation of the monomeric group, the formation of a Long Chain Branch (LCB) or T-branch. For a multi- and/or bifunctional component to impact polymer rheology, it is important that (1) at least two functional groups of the component molecule react and (2) effective branches are formed in the polymer.

WO2013/059042 describes the use of ethylene and/or CTA feed distribution to broaden molecular weight distribution (MWD) and increase melt strength, while keeping all other process conditions constant The use of highly reactive multifunctional components is also subject to other process and/or polymer concerns, such as stability of the component, premature polymerization and fouling formation potential in the compression and preheating sections, reactor fouling, gel formation in polymer, process stability potentially leading to ethylene decomposition, and the like. Additional polymerizations are described in WO 2013/149699 and WO2013/149698. There remains a need for such processes in which low concentrations of coupling and/or branching components can be used to achieve the desired high G' value products for film and extrusion coating applications, while avoiding or reducing undesired product and process issues, as product gels and process instability and/or fouling. Furthermore, the lower concentration of coupling and/or branching components leads to lower consumption and costs. These needs and others have been met by the following invention.

SUMMARY OF THE INVENTION

In one aspect, the invention provides a process to form an ethylene-based polymer with increased G' value through the use of a coupling and/or branching component, in combination with a low activate CTA system, and/or feeding preferentially a higher concentration of CTA to downstream reaction zones. In another aspect, the invention provides a process to form an ethylene-based polymer comprises polymerizing a reaction mixture comprising ethylene, at least one symmetrical polyene and at least one chain transfer agent system comprising at least one CTA; wherein the polymerization takes place in the presence of at least one free-radical initiator; wherein the polymerization takes place in a reactor configuration comprising at least two reaction zones, reaction zone 1 and reaction zone i (i≥2), wherein reaction zone i is downstream from reaction zone 1; and wherein the ratio of "the activity of the CTA system of the feed to the first reaction zone" to the "activity of the CTA system of the cumulative feed to the reaction zone i," ($Z_1/Z_i$), is ≤(0.8–0.2*log(Cs)), wherein Cs is from 0.0001 to 10.

In another aspect, the invention provides a process to form, the process comprising polymerizing a reaction mixture comprising ethylene, at least one symmetrical polyene and at least one chain transfer agent system comprising at least one CTA; wherein the polymerization takes place in the presence of at least one free-radical initiator; wherein the polymerization takes place in a reactor configuration comprising at least two reaction zones, reaction zone 1 and reaction zone i (i≥2), wherein reaction zone i is downstream from reaction zone 1; and wherein at least one of (A) the chain transfer agent system has a Cs value, at 130° C. and 1360 atmosphere, of ≤ to 0.020 and (B) the ratio of CTA activity in the feeds to the first reaction zone and reaction zone i ($Z_1/Z_i$) is ≤0.90.

DETAILED DESCRIPTION

Figure 1:
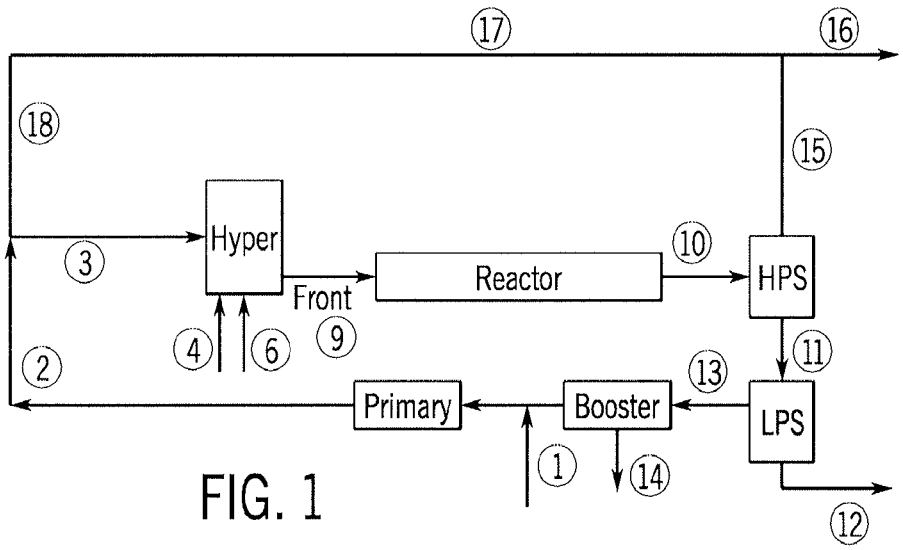
FIG. 1 is a process flow diagram for Comparative Examples (C.Exs.) 10 and 11 and Inventive Examples (I.Exs.) 1 and 2.

The invention provides processes to form ethylene-based polymers, as described above. The invention allows a lower consumption of a coupling and/or branching component, while maintaining desired product characteristics and avoiding and/or reducing product gel or process instability and/or fouling issues. An inventive process may comprise a combination ≥2 embodiments described herein.

Polyene (Branching Agent) Structures—

Polyenes are compounds which contain multiple (≥2) free radical polymerizable olefinic moieties connected by some form of inert linking group. These compounds can be symmetric (all polymerizable olefin ends (each terminal C=C bond) the same) or asymmetric. For symmetrical polyenes, the chemical nature of each terminal C=C double bond is the same, for example, acrylate, methacrylate, vinyl, allyl, etc. These compounds can be described by the general formulas i) through vii):

wherein t is from 2 to 20;

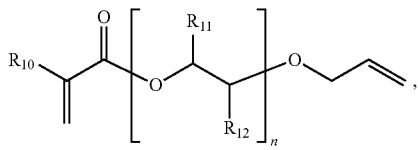

wherein, $R_{10}$, $R_{11}$ and $R_{12}$ are each independently selected form H or an alkyl, and n is from 1 to 50;

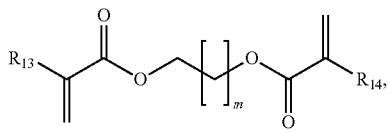

wherein $R_{13}$ and $R_{14}$ are each independently selected form H or an alkyl, and m is from 1 to 50;

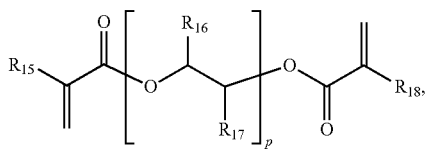

wherein $R_{15}$, $R_{16}$ $R_{17}$ and $R_{18}$ are each independently selected form H or an alkyl, and p is from 1 to 50;

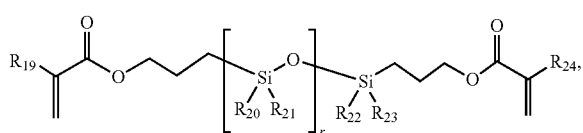

wherein $R_{19}$, $R_{20}$, $R_{21}$, $R_{22}$, $R_{23}$ and $R_{24}$ are each independently selected form H or an alkyl, and r is from 1 to 1000;

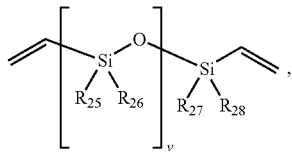

wherein $R_{25}$, $R_{26}$, $R_{27}$ and $R_{28}$ are each independently selected form H or an alkyl, and v is from 1 to 1000; and

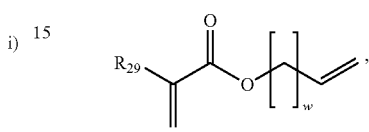

wherein $R_{29}$ is H or an alkyl and w is from 1 to 20.

In an embodiment, the polyene is a symmetrical polyene selected from the group consisting of structure i), structure iii) where $R_{13}=R_{14}$, structure iv) where $R_{15}=R_{18}$, structure v) where $R_{19}=R_{24}$, structure vi), and combinations thereof. In an embodiment, the polyene is a symmetrical polyene selected from the group consisting of structure i), structure iii) where $R_{13}=R_{14}$, structure iv) where $R_{15}=R_{18}$, structure v) where $R_{19}=R_{24}$, and structure vi). In an embodiment, the polyene is a symmetrical polyene selected from the group consisting of structure i), structure iii) where $R_{13}=R_{14}$, and combinations thereof. In an embodiment, the polyene is a symmetrical polyene selected from the group consisting of structure i) and structure iii) where $R_{13}=R_{14}$.

In an embodiment, a process includes polymerizing a reaction mixture comprising a symmetrical polyene and an asymmetrical polyene. In a further embodiment, the asymmetrical polyene comprises an "alpha, beta unsaturated-carbonyl end" and a "C—C double bond end."

In an embodiment having both a symmetrical polyene and an asymmetrical polyene, the symmetrical polyene is selected from the group consisting of structure i), structure iii) where $R_{13}=R_{14}$, structure iv) where $R_{15}=R_{18}$, structure v) where $R_{19}=R_{24}$, and structure vi), and wherein the asymmetrical polyene is selected from the group consisting of structure ii), structure iii) where $R_{13} \neq R_{14}$, structure iv) where $R_{15} \neq R_{18}$, structure v) where $R_{19} \neq R_{24}$, and structure vii), where structures i) through vii) are as above.

In an embodiment, the symmetrical polyene is selected from the group consisting of structure i) and structure iii) where $R_{13}=R_{14}$, and wherein the asymmetrical polyene is selected from the group consisting of structures ii) and iii) where $R_{13} \neq R_{14}$. In an embodiment, the polyene is selected from the group consisting of formulas a) through i):

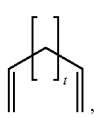

wherein t is from 2 to 20;

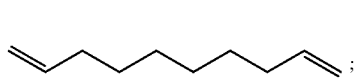

-continued c)

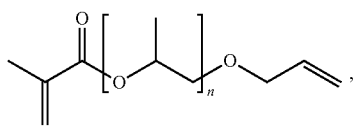

wherein n is from 1 to 50;

(d)

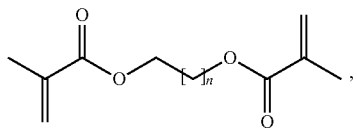

wherein n is from 1 to 50;

e)

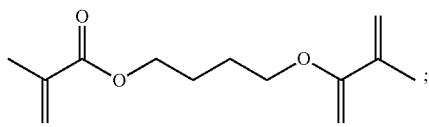

f)

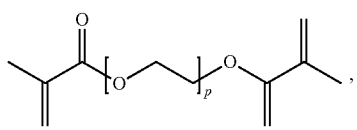

wherein p is from 1 to 50;

g)

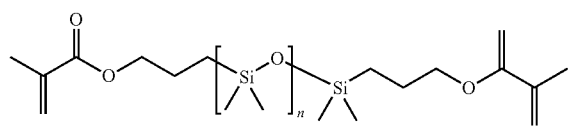

wherein r is from 1 to 1000;

h)

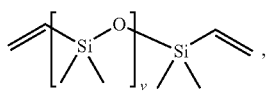

wherein v is from 1 to 1000; and i)

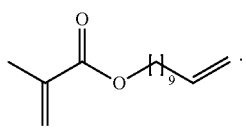

In an embodiment, the polyene is a symmetrical polyene selected from the group consisting of structures a), b), d), e), f), g), h) and combinations thereof. In an embodiment, the polyene is a symmetrical polyene selected from the group consisting of structures a), b), d), e), f), g), and h). In an embodiment, the symmetrical polyene is selected from the group consisting of structures a), d), f), and combinations thereof. In one embodiment, the symmetrical polyene is selected from the group consisting of a), d) and f). In an embodiment, the symmetrical polyene comprises a). In an embodiment, the symmetrical polyene comprises d). In an embodiment, the symmetrical polyene comprises f). In an embodiment, the symmetrical polyene is a). In an embodiment, the symmetrical polyene is d). In an embodiment, the symmetrical polyene is f).

In an embodiment, a process includes polymerizing a reaction mixture comprising a symmetrical polyene and an asymmetrical polyene. In an embodiment having both a symmetrical polyene and an asymmetrical polyene, the symmetrical polyene is selected from the group consisting of structures a), b), d), e), f), g), h), and combinations thereof and the asymmetrical polyene is selected from the group consisting of structures c), i) and combinations thereof. In an embodiment having a symmetrical polyene and an asymmetrical polyene, the symmetrical polyene is selected from the group consisting of structures a), b), d), e), f), g), and h), and the asymmetrical polyene is selected from the group consisting of structures c), and i).

In one embodiment, the reaction mixture further comprises at least one compound containing a carbon-carbon triple bond. See such compounds disclosed in WO2016/012534, incorporated herein by reference. The invention also provides a process to form an ethylene-based polymer, as described herein, and wherein the symmetrical polyene is replaced with at least one compound containing a carbon-carbon triple bond. For example, see such compounds disclosed in WO2016/012534, incorporated herein by reference.

Ethylene-Based Polymer—

In one embodiment, the ethylene-based polymer is a modified low density polyethylene, comprising, in polymerized form, ethylene, and bonded chemical groups derived from the symmetrical polyene. In a further embodiment, the modified LDPE comprises <2.0 wt %, further <1.0 wt %, of other comonomer(s), based on the weight of the modified LDPE. The invention also provides an ethylene-based polymer formed from an inventive process.

In one embodiment, the ethylene-based polymer comprises at least one structure as below:

(Structure I)

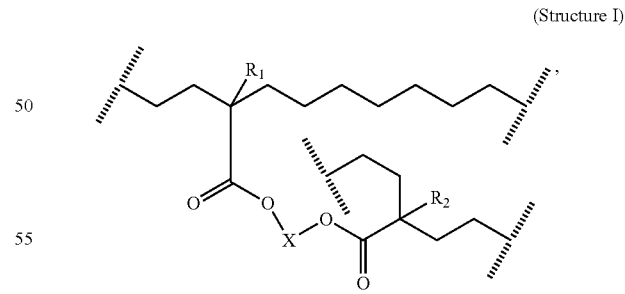

where $R_1$ and $R_2$ are the same and are selected from H or an alkyl, and preferably from H and a $C_1$-$C_6$ group, and wherein and X is selected from the following: —(CR2)n- where each R, independently, is H or alkyl group and n is from 1 to 20; —(CR2-CR2-O)n- where each R, independently, is H or an alkyl group and n is from 1 to 20. In the above structure, the notation "//////" represents a break at the center of a covalent carbon-carbon bond in the hydrocarbon backbone of the ethylene-based polymer.

In one embodiment, the ethylene-based polymer comprises, in reacted form, ≥0.015 moles of the polyene per 1000 moles of carbon atoms incorporated into the polymer, or, in other words, per 500 moles of ethylene units incorporated into the polymer. In one embodiment, the ethylene-based polymer comprises, in reacted form, ≥0.03 weight percent of the polyene, based on the weight of the polymer. In one embodiment, the ethylene-based polymer comprises, in reacted form ≤1 moles, or ≤0.6 moles, or ≤0.4 moles, or ≤0.2 mole of polyene per 1000 moles of carbon atoms incorporated into the polymer, or, in other words, per 500 moles of ethylene units incorporated into the polymer.

In one embodiment, the ethylene-based polymer has a melt index ($I_2$) from 0.1 to 100 g/10 min, or from 0.1 to 50 g/10 min, or from 0.1 to 30 g/10 min. In one embodiment, the ethylene-based polymer has an $I_2$ from 0.3 to 100 g/10 min, or from 0.3 to 50 g/10 min, or from 0.3 to 30 g/10 min, or from 0.5 to 30 g/10 min, or from 1.0 to 10 g/10 min. In one embodiment, the ethylene-based polymer has an $I_2$ from 0.3 to 100 g/10 min, or from 1 to 50 g/10 min, or from 2 to 20 g/10 min, or from 2 to 10 g/10 min. In one embodiment, the ethylene-based polymer has an $I_2$ from 1 to 20 g/10 min. In one embodiment the ethylene-based polymer has a density ≥0.916 grams per cubic centimeter (g/cc or $g/cm^3$), or ≥0.917 g/cc, or ≥0.918 g/cc. In one embodiment the ethylene-based polymer has a density ≤0.940 g/cc, ≤0.935 g/cc, or ≤0.932 g/cc.

In one embodiment, the ethylene-based polymer has a G' value that meets the following relationship: G' (at G'=500 Pa, 170° C.)≥C+D log ($I_2$), wherein C=170 Pa, D=−90.0 Pa/[log (dg/min)], and $I_2$ is the melt index.

The invention also provides a composition comprising an inventive ethylene-based polymer, as described herein. In one embodiment, the composition further comprises an ethylene/α-olefin interpolymer with a density ≤0.954 g/cc. In one embodiment, the composition further comprises another ethylene-based polymer that differs from the inventive ethylene-based polymer in one or more properties, for example, density, melt index ($I_2$), melt elasticity, melt strength, weight average molecular weight (Mw(abs)), number average molecular weight (Mn(conv)), and/or polydispersity index (Mw(abs)/Mn(conv)).

The invention also provides an article comprising at least one component formed from an inventive composition. In one embodiment, the article is a film or coating, for example, an extrusion coating. In one embodiment, the article is a film. In another embodiment, the article is a coating. In one embodiment, the article is a coating for a wire or cable. In one embodiment, the wire or cable is an electrical or telecommunications wire or cable. In one embodiment, the article is a coated sheet, and in a further embodiment the sheet is selected from a metal, a paper, or another polymer substrate or combinations thereof. In a further embodiment, the coated sheet is used in a wire or cable configuration. In another embodiment, the coated sheet is used in a packaging application. An inventive composition may comprise a combination of two or more embodiments as described herein. An inventive article may comprise a combination of two or more embodiments as described herein.

For producing a highly branched ethylene-based polymer, a high pressure free-radical initiated polymerization process is typically used. Two different high pressure free-radical initiated polymerization reactor types are known. In the first type, an agitated autoclave vessel having one or more reaction zones is used. The autoclave reactor normally has several injection points for initiator and/or monomer feeds. In the second type, a jacketed tube having one or more reaction zones is used as a reactor. Suitable, but not limiting, reactor lengths may be from 100 to 3600 meters (m), or from 1000 to 2800 m. The beginning of a reaction zone, for either type of reactor, is typically defined by the side injection of initiator of the reaction, ethylene, CTA (or telomer), or comonomer(s), and any combination thereof. A high pressure process can be carried out in autoclave or tubular reactors having one or more reaction zones, or in a combination of autoclave and tubular reactors, each comprising one or more reaction zones. In one embodiment, the inventive process takes place in a reactor configuration comprising a tubular reactor.

A CTA (system) is used to control molecular weight. In one embodiment, one or more CTAs (CTA system) are added to an inventive polymerization process. CTAs typically comprise at least one of the following groups: alkanes, alkenes, aldehydes, ketones, alcohols, ethers, esters, mercaptans or phosphines. In a further embodiment, a CTA comprises at least group of an alkane, an unsaturated hydrocarbon, a ketone, an aldehyde, an alcohol or ether. In one embodiment, the CTA is selected from saturated hydrocarbons, unsaturated hydrocarbons, ketones, aldehydes, alcohols or ethers. In an embodiment, the CTA comprises at least one of the following compounds: alkanes, alkenes, aldehydes or ketones. Exemplary CTAs include, but are not limited to, propylene; isobutane, n-butane, 1-butene, methyl ethyl ketone, acetone, ethyl acetate, propionaldehyde, ISOPAR-C, -E, and -H, and isopropanol; and more preferably propylene, propionaldehyde, butane and isobutane. In one embodiment, the CTA system comprises one or more CTAs. In one embodiment, the CTA system comprises one CTA. In one embodiment, the amount of CTA used is from 0.01 to 10 wt % based on the weight of the total reaction mixture.

In one embodiment, CTA system(s) are added to the polymerization in at least zone 1 and zone i, wherein i≥1, and wherein reaction zone i is downstream from reaction zone 1, and wherein the ratio of "the activity of the CTA system in the feed to reaction zone 1" to "the activity of the CTA system in the cumulative feed to reaction zone i" ($Z_1/Z_i$) is ≤1.0, preferably ≤0.90, or ≤0.82, or ≤0.74. In a further embodiment, ($Z_1/Z_i$) is ≥0.40, or ≥0.45, or ≥0.50.

In one embodiment, CTA system(s) are added to the polymerization in at least zone 1 and zone i, wherein i≥1, and wherein reaction zone i is downstream from reaction zone 1, and wherein the ratio of "the activity of the CTA system in the feed to reaction zone 1" to "the activity of the CTA system in the cumulative feed to reaction zone i" $Z_1/Z_i$) is ≥0.90, or ≥0.92, or ≥0.95, or ≥1.00. In one embodiment, CTA system(s) are added to the polymerization in at least zone 1 and zone i, wherein i≥1, and wherein reaction zone i is downstream from reaction zone 1, the ratio of "the activity of the CTA system in the feed to reaction zone 1" to "the activity of the CTA system in the cumulative feed to reaction zone i" $Z_1/Z_i$) is from 0.90 to 1.40, or from 0.90 to 1.30, or from 0.90 to 1.20, or from 0.92 to 1.40, or from 0.92 to 1.30, or from 0.92 to 1.20, or from 0.92 to 1.10, or from 0.92 to 1.00, or from 0.92 to 0.98.

In an embodiment, CTA system(s) are added to the polymerization in at least zone 1 and zone i, wherein i≥3, and wherein i is the last reaction zone I, and is downstream from reaction zone 1, the ratio of "the activity of the CTA system in the feed to reaction zone 1" to "the activity of the CTA system in the cumulative feed to reaction zone i" $Z_1/Z_i$) is ≤1.3, or ≤1.2, or ≤1.1. In an embodiment, CTA system(s) are added to the polymerization in at least zone 1 and zone i, wherein i≥3, and wherein i is the last reaction zone i and is downstream from reaction zone 1, the ratio of "the activity of the CTA system in the feed to reaction zone 1" to "the activity of the CTA system in the cumulative feed to reaction zone i" ($Z_1/Z_i$) is ≥0.1, or ≥0.2, or ≥0.3. In one embodiment, the overall Cs value of the applied CTA system is ≤0.020, or ≤0.010 or ≤0.006, or ≤0.004 as measured by Mortimer et al at 130° C. and 1360 atmospheres.

In one embodiment, the process includes a high pressure and low pressure recycle loop to improve ethylene efficiency, since ethylene is only partially converted or consumed per reactor pass. Typically, the conversion level per reactor pass is between 20% and 40%. In one embodiment, the polymerization may take place in a tubular reactor as described in WO2013/059042, which uses a multi-zone reactor and alternate locations of feeding fresh ethylene to control the ethylene to CTA ratio and therefore polymer properties. Fresh ethylene may be simultaneously added in multiple locations to achieve the desired ethylene to CTA ratio. In a similar way, addition of fresh CTA addition points may be carefully selected to control polymer properties as described in WO2013/078018. Fresh CTA may be simultaneously added in multiple locations to achieve the desired CTA to ethylene ratio.

The addition points and amounts of make-up ethylene, make-up CTA, and make-up polyene may be appropriately controlled to achieve the desired ratios of CTA to ethylene and polyene to ethylene in the feeds to and/or in the reaction zones. In one embodiment, the polyene (branching agent) is a symmetrical diene, as described herein, and added to the polymerization in an amount from 0.002 to 0.300 mole %, or from 0.005 to 0.300 mole %, based on the total moles of ethylene and symmetrical diene added to the polymerization.

In one embodiment, the polymerization takes place in two reactors. In one embodiment, the polymerization takes place in one reactor with at least two reaction zones. In one embodiment, more polyene, by mass, is added to reaction zone 1 as compared to the amount of polyene, by mass, added to a reaction zone i. As used above, the amount of polyene is determined based on the polyene added to a reaction zone in a make-up feed (i.e., not carry-over polyene). In one embodiment, a greater concentration of polyene is added to reaction zone i as compared to the concentration of polyene added to reaction zone 1. For example, see kg diene/hr amounts in Table 9, or wt % polyene distribution in Table 6. In one embodiment, a greater concentration of polyene is added to reaction zone 1 as compared to the concentration of polyene added to reaction zone i.

In one embodiment, polyene is added to both reaction zone 1 and reaction zone i. In one embodiment, no polyene is added to reaction zone 1. Depending on the reactivity ratios of the polyene and the distribution of polyene between reaction zones, the amount of polyene incorporated into the ethylene-based polymer in each reaction zone may vary.

In one embodiment, prior to being fed into a reaction zone, polyene is fed through a compression stage of a secondary compressor. In an embodiment, polyene is fed through a compression stage of a secondary compressor prior to being fed into each reaction zone which receives polyene. In another embodiment, polyene is fed through a compression stage directly into a reaction zone or directly into the feed for a reaction zone. The choice of feed point into the reaction and/or a reaction zone depends on several factors, including, but not limited to, the solubility of the polyene in pressurized ethylene and/or solvent, the condensation of the polyene in pressurized ethylene, and/or the pre-heater fouling by premature polymerization of the polyene.

In an embodiment, the concentration of polyene in the total ethylene feed to the reactor is <0.2, or <0.1, or <0.05, or <0.025 mole %, based on the total moles of ethylene fed to the reactor. In one embodiment, the ethylene fed to the first reaction zone is at least 10 percent of the total ethylene fed to the polymerization. In one embodiment, the ethylene fed to the first reaction zone is from 10 to 100, or from 20 to 80, or from 25 to 75, or from 30 to 70, or from 40 to 60% of the total ethylene fed to the polymerization.

In one embodiment, the ethylene-based polymer further comprises one or more comonomers, and preferably one comonomer. Comonomers include α-olefins, vinylacetates, acrylates, methacrylates, anhydrides, vinylsilanes, or combinations thereof, each typically having no more than 20 carbon atoms. In one embodiment, the ethylene-based polymer comprises >90, further >92, and further >93 of polymerized ethylene, based on the weight of the polymer. In one embodiment, the ethylene-based polymer comprises >95, further >98, and further >99 of polymerized ethylene, based on the weight of the polymer. In an embodiment, the ethylene-based polymer is an ethylene homopolymer.

In one embodiment, polyene is added prior to, or simultaneously with, the addition of free radical initiator at the inlet of the reaction zone. Preferably, the polyene is added prior to the free radical initiator addition to allow for a good dispersion of the polyene. Free radical initiators are generally used to produce the inventive ethylene-based polymers.

Free radical initiators are generally used to produce the inventive ethylene-based polymers. A free radical initiator, as used here, refers to a free radical generated by chemical and/or radiation means. Free radical initiators include organic peroxides including cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxide initiators are used in an amount from 0.001 to 0.2 wt %, based upon the weight of polymerizable monomers. In one embodiment, an initiator is added to at least one reaction zone, and the initiator has a half-life temperature at one second >255° C., or >260° C. In a further embodiment, such initiators are used at a peak polymerization temp. from 320° C. to 350° C. In a further embodiment, the initiator comprises at least one peroxide group incorporated in a ring structure. Examples of such initiators include TRIGONOX 301 (3,6,9-triethyl-3,6,9-trimethyl-1,4,7-triperoxonane) and TRIGONOX 311 (3,3,5,7,7-pentamethyl-1,2,4-trioxepane), both available from Akzo Nobel, and HMCH-4-AL (3,3,6, 6,9,9-hexamethyl-1,2,4,5-tetroxonane) from United Initiators. See also WO 02/14379 and WO 01/68723.

In one embodiment, for the polymerization process described herein, the maximum (or peak) temperature for each reaction zone is from 150° C. to 360° C., or from 170° C. to 350° C., or from 200° C. to 340° C. In a further embodiment, the maximum temperature for each reaction zone which receives make-up polyene (i.e., new and/or recycled polyene, not including carry-over polyene (from previous reaction zone)) is from 260° C. to 330° C., or from 270° C. to 320° C., or from 280° C. to 310° C.

In one embodiment, the maximum temperature (max. temp.) in the first reaction zone >the max. temp. for each subsequent reaction zone. In one embodiment, the max. temp. in the first reaction zone is >300° C., or >310° C., or >320° C. In one embodiment, the max. temp. in the first reaction zone is at least 10° C., or 20° C., or 30° C. greater than the max. temp. of each subsequent reaction zone. In one embodiment, the max. temp. in the last reaction zone is <the max. temp. of each prior zone.

In one embodiment, the polymerization pressure as measured at the first inlet of the reactor is from 1000 bar to 3600 bar, or from 1200 bar to 3500 bar, or from 1500 to 3400 bar, or from 2000 to 3200 bar. In one embodiment, the polyene is subject to an "oxygen removal step" prior to being fed to a reaction zone. In one embodiment, the polyene is stored in a feed vessel, and wherein the feed vessel has a "head-space gas" comprising less than 5.0 volume percent oxygen. In one embodiment the total ethylene-based feed flow to the reactor from 30 to 400 tons/hr, or from 50 to 400 tons/hr, or from 75 to 400 tons/hr, or from 10 to 400 tons/hr.

In one embodiment, the polymerization takes place in at least one tubular reactor. A process for forming an ethylene-based polymer may comprise a combination of two or more embodiments as described herein. An inventive composition may comprise one or more additives, which include, but are not limited to, stabilizers (e.g., antioxidants), plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10% of the combined weight of one or more additives, based on the weight of the inventive polymer. An inventive composition may comprise at least one other polymer, in addition to an inventive ethylene-based polymer. Suitable polymers for blending with the inventive polymers include natural and synthetic polymers.

Definitions

Unless stated to the contrary, implicit from the context, or customary in the art, all parts and percents are based on weight, and all test methods are current as of the filing date of this application. The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

The term "composition," as used herein, includes a mixture of materials, which comprise the composition, as well as reaction products and decomposition products formed from the materials of the composition. The terms "blend" or "polymer blend," as used, refers to a mixture of two or more polymers. A blend may or may not be miscible (not phase separated at molecular level). A blend may or may not be phase separated.

The term "polymer" refers to a compound prepared by polymerizing monomers, whether of the same or a different type. The generic term polymer thus embraces the term homopolymer and the term "interpolymer" as defined below. Trace amounts of impurities may be incorporated into and/or within the polymer. The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, at least one comonomer. The term "ethylene-based interpolymer" refers to an interpolymer that comprises a majority amount of polymerized ethylene, based on the weight of the interpolymer, and at least one comonomer. The term "ethylene-based copolymer" refers to a copolymer that comprises a majority amount of polymerized ethylene, based on the weight of the interpolymer, and a comonomer as the only monomer types.

The term "propylene-based polymer" refers to a polymer that comprises a majority amount of polymerized propylene, based on the weight of the polymer, and, optionally, at least one comonomer.

The term "polyene," as used herein, refers to a poly-unsaturated compound having two or more carbon-carbon double bonds.

The term "CTA system," as used herein, refers the type and amount of CTA used in a reactor system having two or more reactors or reaction zones.

The term "monomeric CTA," abbreviated mCTA, as used herein, refers to a poly-functional compound having one or more carbon-carbon double bonds and having one or more functional groups with a chain transfer activity (Cs) value measured by Mortimer at 130° C. and 1360 atm of ≥0.10. Examples of mCTAs are listed herein. mCTAs exclude hydrocarbon olefins, such as 1-butene and propylene. For example, mCTAs exclude $C_3$-$C_{20}$ unsaturated hydrocarbons.

The terms "rheology modifier" or "rheology modifying agent," as used herein, refer to a polyene, as described herein, which are able to change the rheology of the polymer, for example, increase G' and/or melt strength, when incorporated into the polymer. Typical rheology modifiers include symmetrical and asymmetrical polyenes and mCTAs. The term "branching agent," abbreviated as "BA," as used herein, refers to components able to form H- or T-branches in a polymer by which the rheology of the polymer is modified, for example, increase of G' and melt strength. Typical BAs include asymmetrical/symmetrical polyenes and mCTAs. The term "coupling agent," as used herein, refers to components able to form H-branches between two polymer molecules, by which the rheology of the polymer is modified, such as, for example, by increase of G' and melt strength.

The term "alkyl," as used herein, refers to a saturated linear, cyclic, or branched hydrocarbon group. Nonlimiting examples of suitable alkyl groups include, for example, methyl, ethyl, n-propyl, i-propyl, n-butyl, t-butyl, i-butyl (or 2-methylpropyl), etc. In one embodiment, the alkyls have 1 to 20 carbon atoms.

The term "high pressure polymerization process," refers to a free radical polymerization process carried out at an elevated pressure of at least 1000 bar (100 MPa).

The terms "feed" or "feed stream," as used herein, refer to make-up and/or recycled component added to a reaction zone at an inlet. A feed may consist of mCTA, polyene or ethylene, comprise mCTA, polyene or ethylene, or comprise mCTA, polyene and ethylene. The term "feed component(s)," as used herein, refers to the component(s) added to a reaction zone at the inlet to the reaction zone.

The terms "ethylene feed" or "ethylene feed stream," or "ethylene based feed," as used herein, refer to the make-up ethylene and/or recycled ethylene and other reactant(s)

added to a reaction zone at the inlet to the reaction zone. Typically the feed contains a majority molar amount of ethylene, based on the total moles of all the components in the feed stream.

The terms "side stream" or "side feed stream," as used herein, refer to the ethylene-rich feed stream (typically a majority wt % ethylene based on the total weight of components in the stream) to sequential reaction zones.

The term "make-up," when used herein in reference to a reactant (i.e., "make-up ethylene," "make-up CTA," "make-up monomeric chain transfer agent," etc.), refers to the feed stream of the reactant needed to compensate for the converted and/or lost reactant in the high polymerization process. The term "recycle stream," as used herein, refers to recycled ethylene, and, optionally, other reactants and/or other components that are separated from the polymer after exiting a reactor and are fed to one or more reaction zones at the inlet to each reaction zone.

The term "reactor configuration (or reactor system)," as used herein, refers to the components (devices) used to polymerize and isolate a polymer. Such components/devices include, but are not limited to, one or more reactors, a Secondary compressor, a Primary compressor, and a Booster compressor.

The term "reaction zone," as used herein, refers to a reactor zone where polymerization reaction is initiated or reinitiated by the addition of free radicals and/or components which dissociate into and/or generate free radicals. Typically, the reaction medium is heated and/or cooled by a heat transfer medium flowing through the jacket around the reactor. A reaction zone may also start with the addition of make-up ethylene and/or free radicals or components which dissociate into and/or generate free radicals. The term "first reaction zone," as used herein, refers to the first reactor zone where the polymerization is initiated by the addition of radicals or components which dissociate into and/or generate radicals. The first reaction zone ends at the point where there is a new feed of make-up and/or recycled ethylene, radicals, and/or components which dissociate into and/or generate radicals. The terms "subsequent reaction zone," or "sequential reaction zone," as used herein, refer to a reactor zone which receives ethylene and polymer from a previous reactor zone, and where radicals and/or components which dissociate into and/or generate radicals are added at the inlet of the subsequent (or sequential) reactor zone. The subsequent (or sequential) reaction zone ends at the point where there is a new feed of make-up and/or recycled ethylene, radicals, and/or components which dissociate into and/or generate, radicals; however, the nth reaction zone ends at the position of a pressure control device of the reactor system. The number of subsequent (or sequential) reaction zones is (i–1), where i is the total number of reaction zones.

The term "injection point," as used herein, refers to the inlet location of a device (used in a polymerization process) where a feed stream is added to the device.

The terms "chain transfer constant" and "chain transfer coefficient," Cs value, as used herein, refer to the ratio between the "rate of chain transfer" to the "rate of ethylene propagation." See Mortimer references provided in Experimental section. The term "chain transfer activity," as used herein, refers to the sum of molar concentration of each applied CTA component multiplied with its chain transfer constant (Cs). The chain transfer constant (Cs) is the ratio of reaction rates $k_s/k_p$, determined at a reference pressure of 1360 atm and a reference temperature of 130° C. See Mortimer references provided in Experimental section. The term "activity of a CTA system," as used herein, refers to the sum of the products of a CTA's concentration and its Cs value for each CTA in the CTA system (See Equation B).

The Booster compressor (Booster) is a device that compresses a) the low pressure recycle coming from the LPS (Low Pressure Separator), and b) optionally, the recycled compressor packing leaks, each to the pressure level required at the inlet side of the Primary compressor. A Booster can consist of single or multiple compressor frames, and can be potentially combined with Primary compressor frame(s). The Primary compressor (Primary) is a device that compresses the following: a) the make-up incoming ethylene, and/or b) the low pressure recycle coming from the Booster, and/or c) the recycled compressor packing leaks, each to the pressure level required to feed the inlet side of the Hyper compressor. The Primary can consist of single or multiple compressor frames, and can be potentially combined with Booster compressor frame(s). Hyper compressor (Hyper), or Secondary compressor, is a device that compresses the following: a) the ethylene coming from the HPR (High Pressure Recycle), and/or b) the Primary, each to a pressure level required to feed the reactor at its inlet pressure set point. The Hyper comprises a plunger reciprocating compressor and can consist of single or multiple compressor frame(s). For these devices, each compression can be combined with intermediate cooling.

Test Methods

Density—
Samples measured for density were prepared according to ASTM D4703: Annex A: Method C. Samples were pressed at 190° C. and 3,000 psi for five min. 15 tons for two min. and then cooled, under pressure, at 15° C./min. Density measurements were made after conditioning at 23° C. and 50% R.H. for 40 hrs. prior to testing, using ASTM D792 Method B.

Melt Index—
Melt index, or I2, was measured in accordance by ASTM D 1238, Cond. 190° C./2.16 kg, and was reported in g/10 min. The I10 was measured in accordance with ASTM D 1238, Condition 190° C./10 kg, and was reported in g/10 min.

Rheological G'—
The sample used in the G' measurement is prepared from a compression molding plaque. A piece of aluminum foil is placed on a back plate, and a template or mold is placed on top of the back plate. Approximately 12 g of resin is placed in the mold, and a second piece of aluminum foil is placed over the resin and mold. A second back plate is then placed on top of the aluminum foil. The total ensemble is put into a compression molding press run at the following conditions: 3 min at 150° C. and 10 bar, followed by 1 min at 150° C. and 150 bar, followed by a "1.5 min" quench cooling to room temperature at 150 bar. A 25 mm disk is stamped out of the compression-molded plaque. The thickness of the disk is approx. 2.0 mm.

The rheology measurement to determine G' is done in a nitrogen environment at 170° C. and a strain of 10%. The stamped-out disk is placed between the two "25 mm" parallel plates located in an ARES-1 (Rheometrics SC) rheometer oven, which is preheated for at least 30 minutes at 170° C., and the gap of the "25 mm" parallel plates is slowly reduced to 1.65 mm. The sample is then allowed to remain for exactly 5 minutes at these conditions. The oven is then opened, the excess sample is carefully trimmed around the edge of the plates, and the oven is closed. The storage modulus (G') and loss modulus (G") of the sample are measured via a small amplitude, oscillatory shear according to a decreasing frequency sweep form 100 to 0.1 rad/s (when able to obtain a G" value lower than 500 Pa at 0.1 rad/s), or from 100 to 0.01 rad/s. For each frequency sweep, 1—points (logarithmically spaced) per frequency decade are used.

The data are plotted (G' (Y-axis) versus G" (X-axis)) on a log-log scale. The Y-axis scale covers the range from 10 to 1000 Pa, while the X-axis scale covers the range from 100 to 1000 Pa. The Orchestrator software is used to select the data in the region where G" is between 200 and 800 Pa (or using at least 4 data points). The data are fit to a log polynomial model using the fit equation Y=C1+C2 ln(x). Using the Orchestrator software, G' at G" equal to 500 Pa is determined by interpolation. G' at G"=500 Pa is reported.

Gel Content Measurement—

The apparatus consists of a 4-zone laboratory extruder, Model OCS ME 20, with a "150 mm ribbon die (cast film die)," a CR-8 winding unit, an air knife, and an FS-3 line scan camera (50 micron resolution; available from OCS Optical Control Systems GmbH Hullener Feld 36, 58454 Witten, Germany, or an equivalent). Material-specific settings for film-manufacturing: the temp. setting for the heating zones at cylinder and die is determined for an ethylene-based polymer according to MI-ranges in two groups, as follows: Group 1: MI-range 1.5-3 g/10 min (190° C./2.16 kg), temperatures: 160 (first zone)/180/180/180/180° C. (die); Group 2: MI-range 3-6 g/10 min (190° C./2.16 kg), temperatures: 150/150/150/150/150° C. Preset Parameters: Rotational speed (screw): 70 rpm; Haul-off speed: 4 m/min; the cast film thickness is 76 μm±5 μm. One analysis inspects 50 parcels, where a parcel is defined as "24.6 cm³" volume of film which corresponds to a "0.324 m²" surface area for a film thickness of 76 μm. GI200=the average sum of 50 parcels of "the areas of all gels >200 μm in diameter in each parcel." Diameter of gel is determined as the diameter of a circle having equivalent area.

Experimental

Calculations for Z1 and Zi:

The "reactor zone molar concentration of a CTA j in a reactor zone i ([CTA]ji)" is defined as the "total molar amount of that CTA injected to reaction zones 1 to i" divided by the "total molar amount of ethylene injected to reactor zones 1 to i." This relationship is shown below in Equation A, wherein j=1 to $n_{comp}$, wherein $n_{comp}$ is the total number of CTA components in the CTA system.

$$[CTA]_{j_i} = \frac{\sum_{k=1}^{i} n_{CTA,j_k}}{\sum_{k=1}^{i} n_{eth_k}}.$$ (Eqn. A)

In Eqn. A, j≥1, $n_{CTA,j}$ is the "amount of moles of the jth CTA injected to the ith reactor zone," and $n_{eth}$ is the "amount of moles of ethylene injected to the ith reactor zone." The "transfer activity of a CTA (system) in a reactor zone i" ($Z_i$), where i is from 1 to n, and n is the total number of reaction zones, is defined as the "sum of the reactor zone molar concentration of each CTA in the reactor zone" multiplied with its chain transfer activity constant (Cs). The Cs is the ratio of reaction rates $k_s/k_p$ at a reference pressure (1360 Pa) and a reference temperature (130° C.). This relationship is shown in Eqn. B:

$$Z_i = \sum_{j=1}^{n_{compi}} [CTA]_{j_i} \cdot C_{s,j}.$$ (Eqn. B)

In Eqn. B, $[CTA]_{ji}$ is the concentration of the CTA component j in the cumulative feed to reaction zone i (as defined in Eqn. A); $C_{s,j}$ is the Cs values of the CTA component j, and j is from 1 to $n_{comp\,i}$, where $n_{comp\,i}$ is the total number of CTA components in reactor zone i. The ratio of the activity of a CTA (system) of the feed to the first reaction zone ($Z_1$) to the activity of the CTA (system) of the cumulative feed to reaction zone i ($Z_1/Z_i$) is shown in Eqn C:

$$\frac{Z_1}{Z_i} = \frac{\sum_{j_1=1}^{n_{comp,1}} [CTA]_{j_1} \cdot C_{s,j}}{\sum_{j_i=1}^{n_{comp,i}} [CTA]_{j_i} \cdot C_{s,j}}.$$ (Eqn. C)

The chain transfer constant (Cs) values for some chain transfer agents, derived by Mortimer at 130° C. and 1360 atm, are shown in Table 1.

TABLE 1

| | Cs, 130° C., 1360 atm | (0.8-0.2*log(Cs)) | (0.75-0.2*log(Cs)) |
| --- | --- | --- | --- |
| Methanol | 0.0021 | 1.34 | 1.29 |
| Propane | 0.00302 | 1.30 | 1.25 |
| Ethylacetate | 0.0045 | 1.27 | 1.22 |
| n-butane | 0.005 | 1.26 | 1.21 |
| Isobutane | 0.0072 | 1.23 | 1.18 |
| Ethanol | 0.0075 | 1.22 | 1.17 |
| Cyclohexane | 0.0095 | 1.20 | 1.15 |
| Propylene | 0.0122 | 1.18 | 1.13 |
| Isopropanol | 0.0144 | 1.17 | 1.12 |
| Butene-1 | 0.047 | 1.07 | 1.02 |
| Acetone | 0.0168 | 1.15 | 1.10 |
| MEK | 0.06 | 1.04 | 0.99 |
| PA | 0.33 | 0.09 | 0.85 |
| n-butanethiol | 5.8 | 0.65 | 0.60 |

* In the above table, the Cs value is for a CTA system containing only the noted CTA. In Table 1, the Cs-Values as Measured by Mortimer at 130° C. and 1360 atm in References 2, 3 and 4 and calculated boundary values for Z1/Zi ratio. The Cs value is for a CTA system containing only the noted CTA. Ref. No. 2. G. Mortimer; Journal of Polymer Science: Part A-1; Chain transfer in ethylene polymerization; Vol 4, p 881-900 (1966). Ref. No. 3. G. Mortimer; Journal of Polymer Science: Part A-1; Chain transfer in ethylene polymerization. Part IV. Additional study at 1360 atm and 130° C.; Vol 8, p 1513-1523 (1970). Ref. No. 4. G. Mortimer; Journal of Polymer Science: Part A-1; Chain transfer in ethylene polymerization. Part VII. Very reactive and depletable transfer agents; vol 10, p 163-168 (1972). See also P. Ehrlich, G. A. Mortimer, Fundamentals of the free radical polymerization of ethylene, Adv. Polymer Sci., Vol 7, 386-448 (1970); G. Mortimer, Journal of Polymer Science: Part A-1, Chain transfer in ethylene polymerization. Part V. The effect of temperature; vol 8, p 1535-1542 (1970); G. Mortimer, Journal of Polymer Science: Part A-1, Chain transfer in ethylene polymerization Part V. The effect of pressure, vol 8, p 1543-1548 (1970). Chain transfer activity and comonomer reactivity scheme data are described in the following: P. G. Mortimer, Journal of Polymer Science: Part A-1, Chain transfer in ethylene polymerization. Part V. The effect of temperature; vol 8, p 1535-1542 (1970); G. Mortimer, Journal of Polymer Science: Part A-1, Chain transfer in ethylene polymerization Part V. The effect of pressure, vol 8, p 1543-1548 (1970); and G. Mortimer, Journal of Polymer Science: Part A-1, Chain transfer in ethylene polymerization VII. Very reactive and deplete able transfer agents, vol 10, pp. 163-168 (1972).

When only one CTA is used in the total reactor system, Equations B and C simplify to Equations D and E, respectively:

$$Z_i = [CTA]_i \cdot C_s;$$ (Eqn. D)

-continued $$\frac{Z_1}{Z_i} = \frac{[CTA]_1 \cdot C_s}{[CTA]_i \cdot C_s} = \frac{[CTA]_1}{[CTA]_i} \quad \text{(Eqn. E)}$$

For a multiple CTA-system an averaged Cs-value can be calculated with the following equation:

$$Cs(\text{averaged}) = \sum_1^n \frac{[CTA]_n * Cs_n}{\sum_1^n ([CTA]_n * Cs_n)} * Cs_n. \quad \text{(Eqn. F)}$$

For a multiple CTA-system an averaged Cs-value can be calculated with the following equation:

$$Cs(\text{averaged}) = \sum_1^n \frac{[CTA]_n * Cs_n}{\sum_1^n ([CTA]_n * Cs_n)} * Cs_n. \quad \text{(Eqn. F)}$$

An example calculation (propylene concentration=3400 mol-ppm; Cs value of propylene=0.0122; PA concentration=1650 mol-ppm; Cs value of PA=0.33):

Cs(averaged)=[(3400 mol-ppm*0.0122*0.0122)+ (1650 mol-ppm*0.33*0.33)]=0.31·(3400 mol-ppm*0.0122+1650 mol-ppm*0.33)

Polymerization Simulations Models—

A polymerization simulation model with applied reaction scheme and kinetics is described by Goto et al, see reference below. Other reactor and product modeling frameworks are available through Aspen Plus of Aspen Technology, Inc., Burlington, Mass., USA; and PREDICI of Dr. Wulkow Computing in Technology GmbH (CiT), Rastede, Germany. Process and product responses predicted by these model frameworks are determined by the reactor parameters and the applied reaction scheme and kinetic parameters. The applied reaction scheme and kinetic parameters are described below. For each well-stirred autoclave reaction zone one calculation cell can be used. For each tubular reaction zone enough calculation cells are used to accurately represent the pressure, temperature and concentration profiles along the tubular reaction zone, such that the simulated product and process results, as reported in the simulated results, do not change with the addition of more cells.

The polymerization simulations were achieved with Goto LDPE simulation model as described in the following: S. Goto et al; Journal of Applied Polymer Science: Applied Polymer Symposium, 36, 21-40, 1981 (Title: Computer model for commercial high pressure polyethylene reactor based on elementary reaction rates obtained experimentally). The kinetic data used by Goto et al. was derived from high pressure free radical polyethylene polymerization experiments performed at varying temperature, pressure and polymer concentrations as described in the following: K Yamamoto, M Sugimoto; *Rate constant for long chain-chain branch formation in free-radical polymerization of ethylene*; *J. Macromol. Science-Chem.*, A13 (8), pp. 1067-1080 (1979). The following elementary reaction steps are described by Goto et al.: i) propagation of ethylene, ii) termination of radicals, iii) backbiting or SCB formation, iv) transfer to polymer or LCB formation, v) beta elimination of secondary radicals leading to vinyl formation, and vi) beta elimination of tertiary radicals leading to vinylidene formation.

See Table 2 for kinetic data for main reactions, where ko is the pre-exponential or frequency factor; Ea is the activation energy, reflecting the temperature dependence; and ΔV is the activation volume, reflecting the pressure dependence. All kinetic constants are from Goto et al., except the ko, Ea and ΔV values for backbiting, which have been optimized to better reflect the level of methyl branches (as may be analyzed by C13 NMR technique) in high pressure polyethylene, as a function of pressure and temperature conditions.

TABLE 2

Kinetic Constants for Main Reactions

| Reaction | ko | Ea | ΔV |
|---|---|---|---|
| Units | m3/hr/kmol | cal/mol | cc/mol |
| Propagation | 5.63E+11 | 10520 | −19.7 |
| Termination | 3E+11 | 3000 | 13 |
| Backbiting | 2.6E+12 | 12130 | −14 |
| Transfer to Polymer | 1.75E+12 | 14080 | 4.4 |
| Beta Elimination of sec rad | 5.82E+11 | 15760 | −22.6 |
| Beta Elimination of tert rad | 8.51E+10 | 14530 | −19.7 |

The kinetic data for selected CTAs is given in Table 3. The kinetic constants haven been calculated with the help of the kinetic constants on the Cs-value (ks/kp), as determined by Mortimer (see references below), and the ethylene propagation kinetics as given by Goto et al. (see Table 1). The polyenes have been described, and modeled, through assigning kinetic $r_1$ and $r_2$ reactivity ratios (see Tables 3 and 4 below). The kinetic $r_1$ and $r_2$ reactivity ratios are, by definition, linked to the ethylene propagation kinetics for their temperature (Ea) and pressure (ΔV) dependencies. In the simulations, it was assumed that the polyenes do not exhibit additional chain transfer activity. Furthermore, for the total consumption, incorporation and H-branch (inter- and intra-molecular) formation, it has been assumed that, after incorporation of one functional group, the reactivity of the other functional group is not affected. In reality, the reactivity of second functional group will be decreased after incorporation of the polyene through its primary functional group in a polymer molecule. However, this assumption will not affect the first part of this study, as described in Tables 4 to 6.

Figure 8:
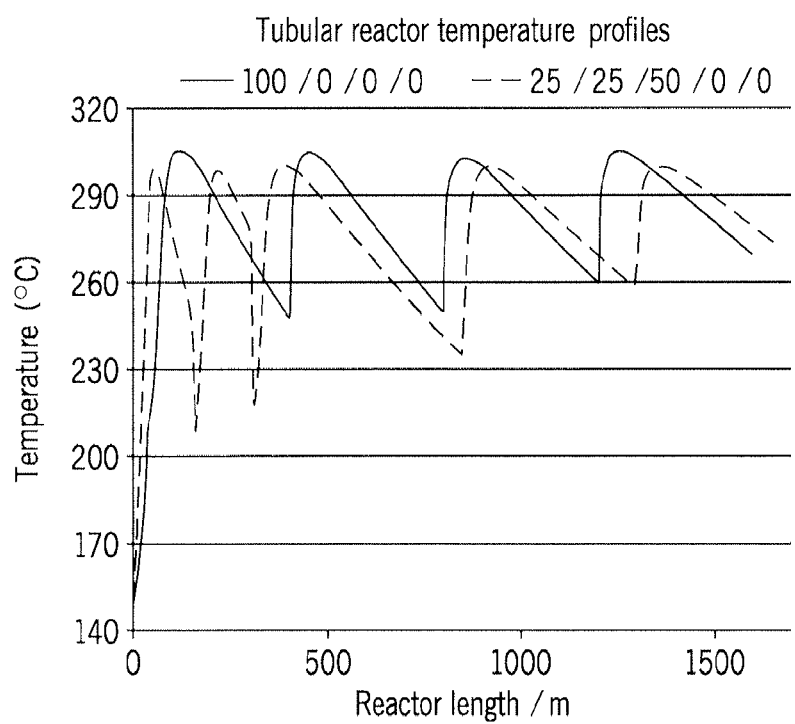
FIG. 8 depicts reactor temperature profiles for simulated reactor configurations.

This study focuses on the optimal incorporation and positioning of the polyene through the reaction of the first functional group, in order to optimize the use and application of the polyene, in regard to enhancement of rheological properties, and prevention or reduction of reactor and pre-heater fouling and gel formation in the final product. Examples of temperature profiles belonging to the reactor configurations simulated in the first part of the study can be found in FIG. 8. The second part of the study, comprising actual polymerization results and simulations of these, focuses on the incorporation of the rheology modifier in the polymer, and the conversion to H-branches, in order to increase melt strength and G' values of the formed polymer. The final impact of a formed H-branch will depend on its "build-in order" and place in the molecular topology. The impact of H-branch formation on melt strength will be as follows: (1) negligible with intra-molecular H-branch formation, (2) low for intermolecular H-branch formation between two small polymer molecules, and (3) significant for intermolecular H-branch formation between two larger molecules. It is assumed that ratio inter-molecular and intra-molecular H-branch is constant for one type of polyene, while (2) is promoted by feeding the polyene to the further down reaction zone(s), while (3) is promoted by feeding the polyene more to the front reaction zone(s).

TABLE 3

Kinetic Constants for Selected CTA's and Polyenes (Bifunctional Components)

| Component | Chain Transfer to Modifier | | | Reactivity Ratios | |
|---|---|---|---|---|---|
| | kao m3/hr/kgmol | Ea cal/mol | ΔV cc/mol | $r_1$ ($k_{11}/k_{12}$) | $r_2$ ($k_{22}/k_{21}$) |
| Propylene (CTA) | 2.20E+11 | 13220 | −16.7 | 3.10 | 0.77 |
| Propion-aldehyde (CTA) | 1.07E+11 | 9720 | −8.4 | 0.00 | 0.00 |
| Isobutane (CTA) | 3.51E+11 | 14020 | −16.7 | 0.00 | 0.00 |

TABLE 4

Reactivity Ratios for Polyenes (Bifunctional Model Components)

| | | Reactivity Ratios | | |
|---|---|---|---|---|
| | | $r_{1B}/r_{1A}$ | $r_1$ ($k_{11}/k_{12}$) | $r_2$ ($k_{22}/k_{21}$) |
| Sym bi-acrylate | Bond A | 1 | 0.08 | 12.50 |
| | Bond B | | 0.08 | 12.50 |
| Asym-acrylate | Bond A | 5 | 0.08 | 12.50 |
| | Bond B | | 0.40 | 2.50 |
| Sym HC diene | Bond A | 1 | 1 | 1 |
| | Bond B | | 1 | 1 |
| BDMA | Bond A | 1 | 0.08 | 12.50 |
| | Bond B | | 0.08 | 12.50 |
| PPG-AEMA | Bond A | 1 | 0.08 | 12.5 |
| | Bond B | | 0.4 | 2.5 |

Sym bi-acrylate = symmetrical bi-acrylate; Asym-acrylate = asymmetrical acrylate; Sym HC diene = symmetrical hydrocarbon diene; BDMA = 1,4-butanediol dimethacrylate; PPG-AEMA = poly(propylene glycol) allyl ether methacrylate.

Study 1—Simulated Polymerizations (Comparative and Inventive)

Description of Flow Diagrams and CTA and/or Polyene Feed Distribution—Overview

Other than mentioned in the flow diagrams in FIGS. 2, 3 and 4, described below, the polyene feed can optionally be freely distributed over the main compression streams fed to and/or distributed over the side streams (20) and/or (21) and/or front stream (9). Polyene streams (6) can be fed in the inlet(s), interstage(s), outlet(s) of the Hyper and/or directly into the reaction zones. Furthermore, the polyene can be optionally dosed at the inlet, outlet or interstages of the Primary and/or Booster compressor systems.

For each polymerization, in the Reactor, the polymerization is initiated with the help of free radical initiation systems injected and/or activated at the inlet of each reaction zone. The max. temp. in each reaction zone is controlled at a set point by regulating the concentration and/or feed amount of initiation system at the start of each reaction zone. After finishing the reaction and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11) which is sent for further separation to the LPS. Ethylene stream (15) is cooled and cleaned in stream (17). Stream (16) is a purge stream to remove impurities and/or inerts. The polymer separated in the LPS is further processed in (12). The ethylene removed (13) in the LPS is fed to the Booster, where, during the compression, condensables such as solvent, lubrication oil and others are collected and removed through stream (14). The outlet of the Booster is combined with make-up ethylene stream (1), and further compressed by the Primary compressors.

Description of Flow Diagram Used for C.Exs. 10 and 11 and I.Exs. 1 and 2—

FIG. 1 shows a flow scheme of a simulated high pressure polymerization plant configuration containing a tubular reactor with an ethylene feed distribution of 100/0/0/0. Stream (1) is the make-up ethylene which is compressed together with the outlet of the Booster by the Primary to stream (2). Stream (2) is combined with high pressure recycle stream (18) and fed to the inlet of the "Hyper". The Hyper pressurizes the ethylene feed stream to a level sufficient to feed the high pressure tubular reactor (Reactor). Stream (4) depicts the CTA system make-up feed. CTA make-up streams (4) can be fed in the inlet(s), interstage(s), outlet(s) of the Hyper and/or inlet(s) of the reaction zones. Furthermore, the CTA can be optionally dosed at the inlet, outlet or interstages of the Primary and/or Booster compressor systems. The CTA systems can consist of a single and/or multiple components and include varying compositions. Stream (6) depicts the polyene feed. The polyene feed can, in principle, be freely distributed over the reaction zones through direct injection into reaction zone(s). The polyene can be optionally dosed at the inlet, outlet or interstages of the Primary and/or Booster compressor systems. The discharge temperature of the Hyper is typically in the range of 60 to 100° C. The ethylene feed to the first reaction zone is typically preheated to a temperature from 130 to 180° C., while the ethylene of the side feed is fed to the reactor at the Hyper discharge temperature or cooled prior to feeding to the reactor. For dimensions and configurations of the Reactor, see Table 5.

Description of Flow Diagram Used for C.Ex. 12—

Figure 2:
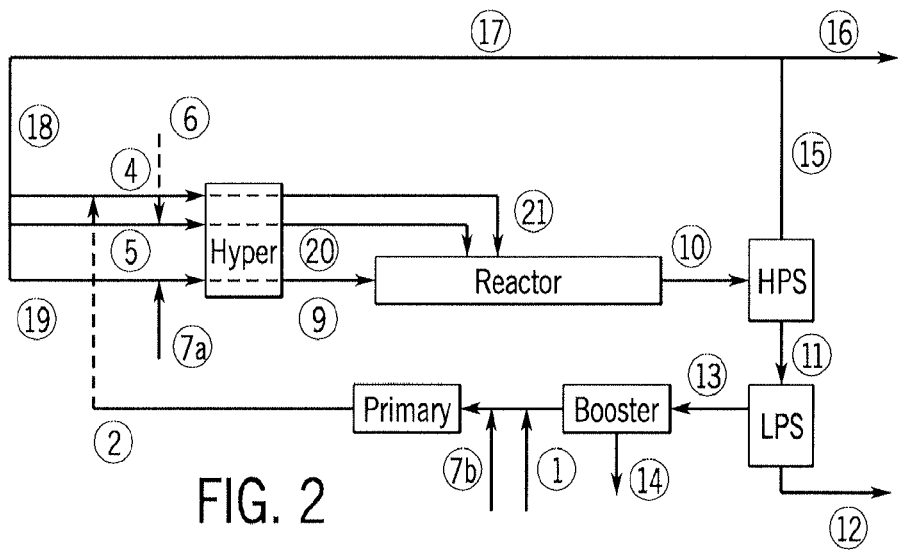
FIG. 2 is a process flow diagram for C.Ex. 12.

FIG. 2 shows the flow scheme of the high pressure polymerization process with a tubular reactor, to produce C.Ex. 12. Stream (1), make-up ethylene, is compressed together with the outlet of the Booster by Primary compressor system resulting in flow (2). Stream (2) is fed together with additional ethylene from the high pressure recycle stream (18) through line 4 to the Hyper compressor part feeding the side stream (21) of the Reactor. The Hyper compressor part feeding the front stream (9) receives ethylene feed through line (19) from the high pressure recycle stream (18). The Hyper compressor part feeding the side stream (20) receives ethylene feed from the high pressure recycle stream (18). The make-up CTA system can be fed through Line (7a) and Line (7b). The distribution of the make-up CTA over line (7a) and (7b) influences the CTA conc. in the reactor zones. For information about the Reactor, see Tables 5 and 6.

Description of Flow Diagram Used for C.Exs. 13 and 14 and I.Exs. 3, 4, 5 and 7—

Figure 3:
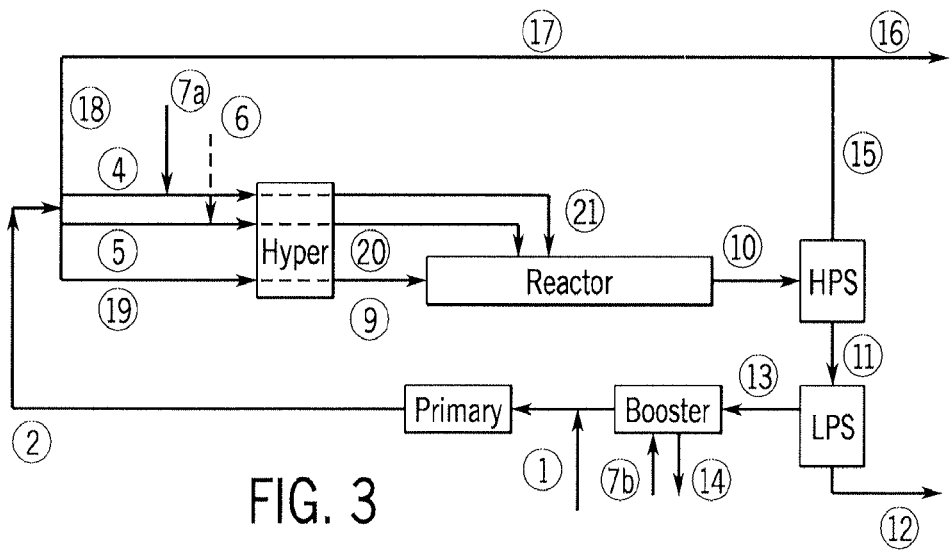
FIG. 3 is a process flow diagram for C.Exs. 13 and 14 and I.Exs. 3, 4 and 5.

FIG. 3 shows the flow scheme of the high pressure polymerization process with a tubular reactor, used to produce C.Exs. 13 and 14 and I.Exs. 3, 4 and 5. Stream (1), make-up ethylene, is compressed together with the outlet of the Booster by Primary compressor system resulting in flow (2). Stream (2) is fed together with additional ethylene from the high pressure recycle stream (18) through line (5) and line (19) to the Hyper compressor parts feeding respectively the side stream (20) and the stream (9) of the Reactor. The Hyper compressor part feeding the side stream (21) receives ethylene feed through line (4) from the high pressure recycle stream (18). The make-up CTA system can be fed through Line (7a) and Line (7b). The distribution of the make-up CTA over line (7a) and (7b) influences the CTA concentration in the reactor zones. Stream (6) depicts the polyene feed. For reactor system info, see Tables 5 and 6.

Description of Flow Diagram Used for C.Ex. 15 and I.Ex. 6—

Figure 4:
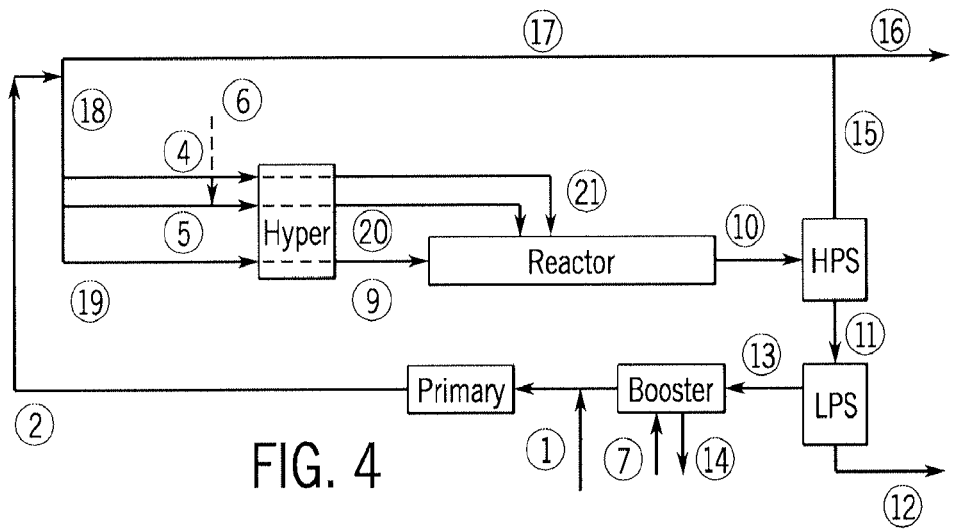
FIG. 4 is a process flow diagram for C.Ex. 15 and I.Ex. 6.

FIG. 4 shows the flow scheme of the high pressure polymerization process with a tubular reactor, used to produce C.Ex. 15 and I.Ex. 6. Stream (1), make-up ethylene, is compressed together with the outlet of the Booster by Primary compressor system resulting in flow (2). Stream (2) is fed together with the ethylene from the high pressure recycle stream (19) through lines (19), (5) and (4) to the Hyper compressor parts compressing respectively the front stream (9) and the sides streams (20) and (21) of the Reactor. Stream (6) depicts the polyene feed. The CTA is fed through line (7) to the Booster. Optionally the CTA can be fed to the inlet, interstages or outlet of the Primary or in line (18). For reactor system info, see Table 5 and 6.

C.Exs. 10 and 11 show simulations with different CTAs, respectively isobutane and propionaldehyde, without feeding branching agent. All make-up CTA is fed together with the ethylene feed to the front of reactor. The ratio in CTA concentration inlet/outlet (Z1/Zi) is 1. The process conditions are shown in Table 5, while the predicted branching and conversion levels are shown in Table 6. The branching, SCB and LCB, and conversion levels are quite similar, except of small variations in the SCB levels caused by the high molar concentration of isobutane needed, resulting in lower effective ethylene concentration in the reactor by which the SBC reaction is promoted over the propagation reaction in case of isobutane as CTA. The predicted LCB levels do not indicate a difference in MWD for both comparative polymers; however data on C.Exs. 1', 2' and 3', produced at similar process conditions (see Table 8 and 9), except of type and distribution of CTA, show that using a low active CTA as isobutane and/or distributing the CTA more to the back of reactor (Z1/Zi below 1) broadens the MWD as indicated by the G' in Table 11. It can be concluded, that that C.Ex. 11, made with isobutane as CTA, has higher G' values than C.Ex. 10 made with propionaldehyde as CTA despite the comparable LCB levels. This means that when applying a branching agent to achieve a targeted higher level of G', less branching agent needs to fed, incorporated and converted to H-branches when isobutane is used versus the case that propionaldehyde is used as CTA. Lower level of branching agent to be fed or H-branch to be formed in polymer means lower cost and less risk of respectively reactor instability and fouling and gel formation in polymer.

I.Exs. 1 and 2 shows simulations at similar process conditions using respectively a symmetrical acrylate and HC-diene, as described in Tables 5 and 6 as branching agent. Due to the same process conditions and the same distribution and type (isobutane) of CTA the starting MWD and G' before adding the branching agent will be similar. The process conditions are shown in Table 5, while the predicted branching and conversion levels are shown in Table 6. To reach the desired MWD, ME or G' values the same level of H-branches has to be formed in the polymer. The conversion level to H-branches for the symmetrical acrylate and HC-diene of respectively 99.4% and 22.2% show that at a molar scale about 4.5 times more HC-diene has to fed versus BDMA to reach a similar H-branch level and that the polymer will contain a high level of residual HC-diene due to the incorporation level of 59.3% versus the almost complete incorporation of 99.99% for the symmetrical acrylate.

C.Exs. 12 and 13 show simulations for reactor configuration with two ethylene side feed streams and an ethylene feed distribution of 25/25/50/0/0 over the five reaction zones. Propionaldehyde is used as CTA with different distributions (Z1/Zi) of respectively 1.33 and 0.067 for C.Exs. 12 and 13. The process conditions and the predicted branching (LCB and SCB) and conversion levels are shown in Tables 5 and 6, respectively. As learned from C.Exs. 2 and 3, these different CTA feed distributions will strongly affect MWD, ME and G' values. C.Ex. 12 with a Z1/Zi value of 1.33 will result a narrower MWD product with lower ME and G' values and therefore more branching agent is needed to reach target ME and G' values for meeting e.g. extrusion coating product performance. On the other hand C.Ex. 13 using propionaldehyde as CTA with a distribution of the CTA more to back of the reactor will allow production of broader MWD product higher ME and G' values despite the use of high active CTA.

C.Ex. 14 shows a simulation for a reactor configuration with two ethylene side feed streams and an ethylene feed distribution of 25/25/50/0/0 over the five reaction zones. Propylene is used as CTA with a distribution (Z1/Zi) of respectively 1.33 and 0.67 for C.Exs. 12 and 13. The process conditions and the predicted branching (LCB and SCB) and conversion levels are shown in Tables 5 and 6, respectively. C.Ex. 14 uses propylene as CTA with a distribution of the propylene more to back of the reactor will allow when applying a branching agent production of broad MWD product with high ME and G' values with lower feed quantities of branching agent and H-branch level formed despite the using a CTA with increased activity.

C.Ex. 15 shows a simulation for a reactor configuration with two ethylene side feed streams and an ethylene feed distribution of 25/25/50/0/0 over the five reaction zones. Isopropanol is used as CTA with an even distribution (Z1/Zi) of respectively 1. The process conditions and the predicted branching (LCB and SCB) and conversion levels are shown in Tables 5 and 6, respectively. C.Ex. 15 uses Isopropanol as CTA with an even distribution over the ethylene feed streams will necessitate for the production of a broad MWD product with high ME and G' values higher feed quantities of branching agent and H-branch level formed due to the use of a CTA with increased activity (Cs=0.0144) and the applied distribution of the CTA over the ethylene feed streams.

I.Exs. 3 and 4 show simulations for reactor configuration with two ethylene side feed streams and an ethylene feed distribution of 25/25/50/0/0 over the five reaction zones. Propionaldehyde is used as CTA with a distribution (Z1/Zi) of respectively 0.67 in both inventive examples. The process conditions and the predicted branching (LCB, SCB and H-branches) and conversion levels are shown in Tables 5 and 6, respectively. As learned from C.Exs. 2' and 3', different CTA feed distributions will strongly affect MWD, ME and G' values. Using propionaldehyde as CTA with a distribution of the CTA more to back of the reactor (Z1/Zi=0.67) will allow production of broad MWD product with high ME and G' values despite the use of a high active CTA. In I.Ex. 4 the feed distribution of the branching agent is more towards the ethylene side feed flows versus inventive as shown by the respective branching agent distribution of 25/25/50 and 14/29/57 for I.Exs. 3 and 4. I.Ex. 4 lead to a more even starting concentration of branching agent in the first three reaction zone and therefore to a better distribution of the branching agent in the polymer and less risk of reactor instability and/or fouling or product gels.

I.Exs. 5, 6 and 7 show simulations for reactor configurations with two ethylene side feed streams and an ethylene feed distribution of 25/25/50/0/0 over the five reaction zones. Propionaldehyde is used as CTA with a distribution (Z1/Zi) of respectively 0.67 in I.Ex. 5, while isobutane is used as CTA at different feed distributions in I.Exs. 6 and 7. The process conditions and the predicted branching (LCB, SCB and H-branches) and conversion levels are shown in Tables 5 and 6, respectively. The use of propionaldehyde in I.Ex. 5 with a CTA feed distribution resulting in a Z1/Zi=0.67 or the use of a low active CTA as isobutane in I.Exs. 6 and 7 with a CTA feed distribution resulting in Z1/Zi values of respectively 1 and 0.85, results in polymers which needs only low levels of additional H-branches to reach the desired broad MWD and high values for ME and G'. In all three inventive examples HC-diene is used as branching agent. The HC-diene is only fed in the first two reaction zones in order to improve incorporation level and further conversion to H-branches. Despite this feed strategy the incorporation and conversion levels are low and are about 71% and 30%, respectively. This means that the product will contain high level of residual free HC-diene and that the low conversion level to H-branches will require much higher molar concentration in the reactor to achieve the required H-branch level. Therefore lowering the required H-branch level to achieve the required broad MWD and high ME and G' values through the inventive use of low active CTAs and or distribution of the CTA system over the reactor will lead to a lower consumption of HC-diene, lower concentration in the reactor, lower residual level in the product and less gels in the product by inter- and/or intra-molecular crosslinking through the branching agent.

TABLE 5

Reactor Configurations in Comp. and Inv. Simulated Polymerizations

| Ex. | # of Rx-zones # | Ethylene feed distribution over Rx-zones % mass of ethy. | Reactor inlet pressure bar | Start temp, in Rx-zone 1 ° C. | Temp of Ethylene side feed ° C. | Peak temp Rx-zones ° C. | CTA | Ratio CTA conc. Z1/Zi |
|---|---|---|---|---|---|---|---|---|
| C. Exs. 10 and 11 and I. Exs. 1 and 2**: Inside tube diameter (60 mm) and Rx-zone length (distribution): 1600 m (400-400-400-400) | | | | | | | | |
| C. Ex. 10 | 4 | 100/0/0/0 | 2500 | 150 | | 305 in each zone | Isobutane* | 1 |
| C. Ex. 11 | 4 | 100/0/0/0 | 2500 | 150 | | 4*305 | PA | 1 |
| I. Ex. 1 | 4 | 100/0/0/0 | 2500 | 150 | | 4*305 | Isobutane* | 1 |
| I. Ex. 2 | 4 | 100/0/0/0 | 2500 | 150 | | 4*305 | Isobutane* | 1 |
| Comparative 12-15 and Inventive 3-7: Inside tube diameter 35-50-60-60-60 mm and Rx-zone length (distribution): 1700 m (150-150-500-500-400) | | | | | | | | |
| C. Ex. 12 | 5 | 25/25/50/0/0 | 2500 | 150 | 80 | 5*300 | PA | 1.33 |
| C. Ex. 13 | 5 | 25/25/50/0/0 | 2500 | 150 | 80 | 5*300 | PA | 0.67 |
| C. Ex. 14 | 5 | 25/25/50/0/0 | 2500 | 150 | 80 | 5*300 | Propylene | 0.67 |
| C. Ex. 15 | 5 | 25/25/50/0/0 | 2500 | 150 | 80 | 5*300 | Isopropanol | 1 |
| I. Ex. 3 | 5 | 25/25/50/0/0 | 2500 | 150 | 80 | 5*300 | PA | 0.67 |
| I. Ex. 4 | 5 | 25/25/50/0/0 | 2500 | 150 | 80 | 5*300 | PA | 0.67 |
| I. Ex. 5 | 5 | 25/25/50/0/0 | 2500 | 150 | 80 | 5*300 | PA | 0.67 |
| I. Ex. 6 | 5 | 25/25/50/0/0 | 2500 | 150 | 80 | 5*300 | Isobutane* | 1 |
| I. Ex. 7 | 5 | 25/25/50/0/0 | 2500 | 150 | 80 | 5*300 | Isobutane* | 0.85 |

*Isobutane (CTA) has a Cs, at 130 C. and 1360 atm, of 0.0072.
**C. Ex. = Comp. Example; I. Ex. = Inv. Example.
C. Exs. 10-15 are each a simulated comparative example; I. Exs. 1-7 are each a simulated inventive example.

TABLE 6

Type and Distribution of Polyenes and Predicted Branching and Incorporation Levels

| Ex. | Branching agent | BA feed distribution wt % | LCB #/1000 C | SCB #/1000 C | Conv. wt % | Incorporation level % | Conv. to H-branches % | H-branch level #/1000 C |
|---|---|---|---|---|---|---|---|---|
| Comp. 10-11 and Inv. 1-2: Inside tube diameter (60 mm) and Rx-zone length (distribution): 1600 m (400-400-400-400) | | | | | | | | |
| C.Ex. 10 | none | none | 4.6 ± 0.1 | 27.3 ± 0.2 | 35.3 | none | none | none |
| C. Ex. 11 | none | none | 4.6 ± 0.1 | 26 ± 0.2 | 35.9 | none | none | none |
| I. Ex. 1 | BDMA | 100/0/0/0 | 4.6 ± 0.1 | 27 ± 0.2 | 36.3 | 99.99 | 99.4 | 0.094 |
| I. Ex. 2 | HC-diene | 100/0/0/0 | 4.6 ± 0.1 | 25.9 ± 0.2 | 36.4 | 59.3 | 22.2 | 0.075 |
| Comp. 12-14 & Inv. 3-6: Inside tube diam. 35-50-60-60-60 mm and Rx-zone length (distr.) 1700 m (150-150-500-500-400) | | | | | | | | |
| C. Ex. 12 | none | | 4.7 ± 0.1 | 25.6 ± 0.2 | 37.3 | | None | none |
| C. Ex. 13 | none | | 4.7 ± 0.1 | 25.6 ± 0.2 | 36.5 | | None | none |
| C. Ex. 14 | none | | 4.7 ± 0.1 | 29.5 ± 0.2 | 36.3 | | None | none |
| C. Ex. 15 | HC-diene | 50/50/0/0/0 | 4.7 ± 0.1 | 25.6 ± 0.2 | 38.3 | 70.8 | 30.2 | 0.104 |
| I. Ex. 3 | BDMA | 25/25/50/0/0 | 4.7 ± 0.1 | 25.6 ± 0.2 | 37.4 | 99.99 | 99.2 | 0.102 |
| I. Ex. 4 | BDMA | 14/29/57/0/0 | 4.7 ± 0.1 | 25.6 ± 0.2 | 37.3 | 99.99 | 98.6 | 0.102 |
| I. Ex. 5 | HC-diene | 50/50/0/0/0 | 4.7 ± 0.1 | 25.6 ± 0.2 | 38.3 | 70.7 | 30.2 | 0.105 |
| I. Ex. 6 | HC-diene | 50/50/0/0/0 | 4.7 ± 0.1 | 25.6 ± 0.2 | 38.3 | 70.8 | 30.2 | 0.105 |
| I. Ex. 7 | HC-diene | 50/50/0/0/0 | 4.7 ± 0.1 | 25.6 ± 0.2 | 38.3 | 70.8 | 30.2 | 0.105 |

Study 2—Actual Polymerications (C.Ex. 1'-C.Ex. 9')

For the actual polymerizations, each polymerization was carried out in a tubular reactor with three reaction zones. Organic peroxides (see Table 7) were fed into each reaction zone. In each reaction zone, pressurized water was used for cooling and/or heating the reaction medium, by circulating this water through the jacket of the reactor. Each reaction zone had one inlet and one outlet. Each inlet stream consisted of the outlet stream from the previous reaction zone and/or an added ethylene-rich feed stream. The non-converted ethylene, and other gaseous components in the reactor outlet, were recycled through a high pressure recycle and a low pressure recycle, and were compressed and distributed through the Booster, Primary and Hyper (secondary) compressor systems according to the flow scheme shown in FIG. 6. The polymer was extruded and pelletized (about 30 pellets per gram) using a single screw extruder.

TABLE 7

Initiators C. Exs. 1'-9' Used in Actual Polymerization Runs

| Initiator | Abbreviation | Used in Rx-zone 1/2/3 |
|---|---|---|
| tert-Butyl peroxy-2-ethyl hexanoate | TBPO | yes/yes/no |
| di-tert-butyl peroxide | DTBP | yes/yes/yes |

Description and Synthesis of Asymmetrical Diene Poly(propylene Glycol) Allyl Ether Methacrylate (PPG-AEMA) Used in C.Ex. 4, C.Ex. 5, C.Ex. 6, C.Ex. 7' and C.Ex. 9' as Branching Agent in these Actual Polymerizations—

All methacrylate monomers in this application were prepared in accordance with the method of Ex. 1 in U.S. Pat. No. 4,916,255. In this case, XUS-13402.00, a polyglycol, commercially available from The Dow Chemical Company, was used to make the poly(propylene glycol) allyl ether methacrylate (asymmetric diene). Simulation results on polymer properties for this polyene can be found in Table 10. The structure and additional properties for PPG-AEMA can be found below:

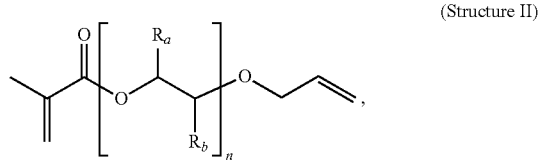

(Structure II)

Mn of about 280 g/mole; n from about 1 to about 10; isomeric oligomeric mixture, for each n, Ra=H and Rb=CH3, and Ra=CH3 and Rb=H).

Description of Flow Diagram Used for C.Exs. 2' and 7'—

Figure 5:
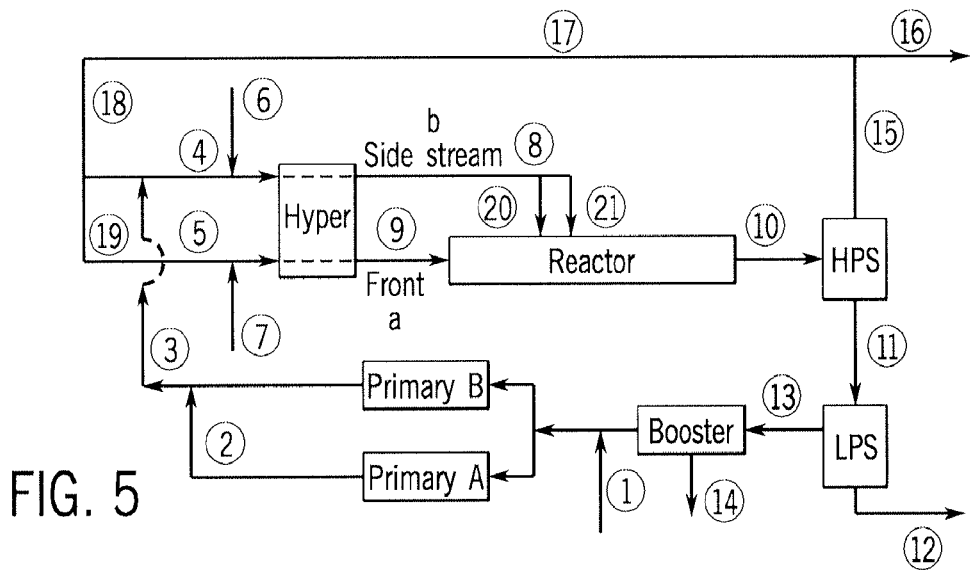
FIG. 5 is a process flow diagram for C.Exs. 2 and 7.

FIG. 5 shows the flow scheme of the high pressure polymerization process with a tubular reactor, used to produce C.Exs. 2' and 7'. Stream (1), make-up ethylene, is compressed together with the outlet of the Booster by Primary compressor system resulting in flow (3). Stream (3) is fed together with additional ethylene from the high pressure recycle stream (19) through line 5 to the Hyper compressor part feeding the side (8) of the Reactor. The Hyper compressor part feeding the front stream (9) receives ethylene feed through line (19) and (5) from the high pressure recycle stream (19). Line (6) and Line (7) depict each separate lines for feeding separately CTA and branching agent to respectively line (4) and line (5).

Description of Flow Diagram Used for C.Exs. 1, 4, 6, 8' and 9'—

Figure 6:
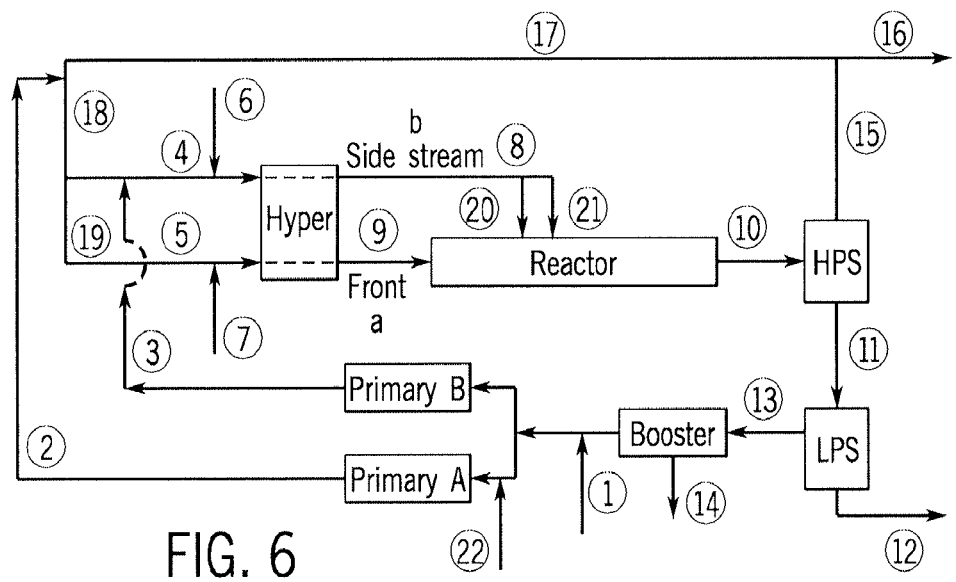
FIG. 6 is a process flow diagram for C.Exs. 1, 4, 6, 8 and 9.

FIG. 6 shows the flow scheme of the high pressure polym. process with a tubular reactor used to produce C.Exs. 1', 4', 6', 8' and 9'. Stream (1), make-up ethylene, is compressed together with the outlet of the Booster by two parallel Primary compressors A+B, both have similar capacity, resulting in flow (2) and flow (3). CTA is added through (22) to the feed of Primary compressor A. Stream (2) is combined with high pressure recycle stream (18), and distributed over flow (4) and flow (19). The Hyper compressor part feeding the front (9) of the reactor, receives from line (18) ethylene feed through line (19) and line (5). The Hyper compressor part feeding the side stream (8) receives ethylene feed through line (4). Line (4) receives ethylene feed from line (3) and additional ethylene from line (18). The Hyper pressurizes the ethylene feed streams to a level sufficient to feed the high pressure tubular reactor (Reactor). Stream (6) and/or stream (7) depict the polyene feed.

Description of Flow Diagram Used for C.Exs. 3' and 5'—

Figure 7:
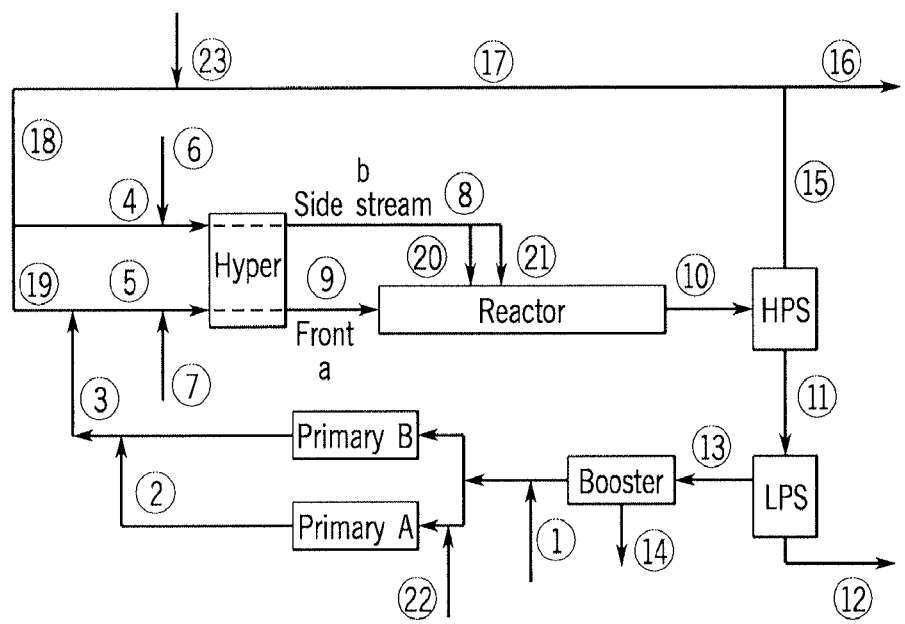
FIG. 7 is a process flow diagram for C.Exs. 3 and 5.

FIG. 7 shows the flow scheme of the high pressure polymerization process with a tubular reactor, used to produce C.Exs. 3' and 5'. Stream (1), make-up ethylene, is compressed together with the outlet of the Booster by Primary compressor system resulting in flow (3). Stream (2) is combined with high pressure recycle stream (19) and fed through line (5) to the Hyper compressor part feeding the front (9) of the Reactor. The Hyper compressor part feeding the side stream (8) receives ethylene feed through line (4). Line (4) receives ethylene feed from line (18). The CTA is fed through line (23). Line 22 is an optional line to feed a CTA component, but was not used in C.Ex. 3'. The Hyper pressurizes the ethylene feed streams to a level sufficient to feed the high pressure tubular reactor (Reactor). Stream (6) and/or stream (7) depict the polyene feed.

C.Ex. 1' (Comparative Ethylene-Based Polymer Made with Isobutane)—

The polymerization was carried out in tubular reactor with three reaction zones, as shown in FIG. 6. The inlet-pressure was 2220 bar, and the pressure drop over the whole tubular reactor system was about 300 bars. Isobutane was used as a CTA, and it was present in each reaction zone inlet, originating from the low pressure and high pressure recycle flows (13) and (15), as well as from injected CTA make-up stream (22). The make-up ethylene was fed through stream (1). After reaching the first peak temperature (max. temp.) in reaction zone 1, the reaction medium was cooled with pressurized water. At the outlet of reaction zone 1, the reaction medium was further cooled by injecting a cold, ethylene-rich feed stream (20), and the reaction was re-initiated by feeding an organic peroxide system. This process was repeated at the end of the second reaction zone, to enable further polymerization in the third reaction zone. The polymer was extruded and pelletized (about 30 pellets per gram), using a single screw extruder, at a melt temperature around 230-250° C. The weight ratio of the ethylene-rich feed streams to the three reaction zones was 1.00:0.80:0.20. The internal process velocity was approximately 12.5, 9 and 11 m/sec for respectively the $1^{st}$, $2^{nd}$ and $3^{rd}$ reaction zones.

C.Ex. 8' (Comparative Ethylene-Based Polymer Made with Propylene)—

The polymerization was carried out in tubular reactor with three reaction zones, as discussed above for C.Ex. 1', except as CTA propylene was added via (22), and the inlet pressure of reaction zone 1 was lower.

C.Ex. 9' (Comparative Ethylene-Based Polymer Made with Propylene and PPG-AEMA)—

The polymerization was carried out in tubular reactor with three reaction zones, as discussed above for C.Ex. 8', except the rheology modifier (PPG-AEMA=Polypropylene glycol allyl ether methacrylate) was added via streams (7) and (6). See also in Tables 8-10.

C.Ex. 2' (Comparative Ethylene-Based Polymer Made with PA)—

The polymerization was carried out in tubular reactor with three reaction zones, as shown in FIG. 5. This configuration leads to the highest ratios of CTA concentration in the front ethylene-based feed versus the concentrations of CTA in sequential ethylene-based feed streams. After reaching the first peak temp. in reaction zone 1, the reaction medium was cooled down with pressurized water. At the outlet of the first reaction zone, the reaction medium was further cooled by injecting a cold ethylene-rich feed stream, and the reaction was initiated again, by feeding an organic peroxide system into the reaction zone. This process was repeated at the end of the second reaction zone, to enable further polymerization in the third reaction zone. The weight ratio of the ethylene-rich feed streams to the three reaction zones was 1.00:0.60:0.40. Propionaldehyde (PA) was used as CTA, and it was present in each reactor inlet, originating from the low and high pressure recycle flows (13) and (15), as well as from injected CTA make-up stream (6) and (7). The make-up ethylene is fed through stream (1).

C.Ex. 7' (Comparative Ethylene-Based Polymer Made with PA and PPG-AEMA)—

The polymerization was carried out in tubular reactor with three reaction zones, as discussed above for C.Ex. 2', except rheology modifier, which was added like the CTA, was added in the suction of the Hyper in separated feed line like streams (6) and (7). Additional information can be found in Tables 8-10.

C.Ex. 3' (Comparative Ethylene-Based Polymer Made with PA)—

The polymerization was carried out in tubular reactor with three reaction zones, as seen in FIG. 7. This configuration leads to the lowest ratios of CTA concentration in the front ethylene-based feed versus the concentrations of CTA in sequential ethylene-based feed streams. After reaching the first peak temperature in reaction zone 1, the reaction medium was cooled down with pressurized water. At the outlet of the first reaction zone, the reaction medium was further cooled by injecting a cold ethylene-rich feed stream (20), and the reaction was initiated again, by feeding an organic peroxide system into the reaction zone. This process was repeated at the end of the second reaction zone, to enable further polymerization in the third reaction zone. The weight ratio of the ethylene-rich feed streams to the three reaction zones was 1.00:0.60:0.40. Propionaldehyde (PA) was used as CTA, and it was present in each reactor inlet, originating from the low and high pressure recycle flows (13) and (15), as well as from injected CTA make-up stream (23). The make-up ethylene is fed through stream (1). Like C.Ex. 1', the rheology modifier (PPG-AEMA) was added via stream (7) and (6).

C.Ex. 5' (Comparative Ethylene-Based Polymer Made with PA and PPG-AEMA)—

The polymerization was carried out in tubular reactor, as discussed above for C.Ex. 3', except of adding the rheology modifier. Additional information can be found in Tables 8-10.

C.Exs. 4' and 6' (Comp. Ethylene-Based Polymer Made with Isobutane and PPG-AEMA)—

The polymerization was carried out in tubular reactor with three reaction zones, in accordance with FIG. 6. The inlet-pressure was 2220 bar, and the pressure drop over the whole tubular reactor system was about 300 bars. Isobutane was used as a CTA, and it was present in each reaction zone inlet, originating from the low pressure and high pressure recycle flows (13) and (15), as well as from injected CTA make-up stream (22). The make-up ethylene is fed through stream (1). PPG-AEMA was used as branching agent, and was fed and distributed through line (6) and line (7), according the feed concs. given in Table 9. After reaching the first peak temperature (max. temp.) in reaction zone 1, the reaction medium was cooled with the aid of the pressurized water. At the outlet of reaction zone 1, the reaction medium was further cooled by injecting a cold, ethylene-rich feed stream (20), and the reaction was re-initiated by feeding an organic peroxide system. This process was repeated at the end of the second reaction zone, to enable further polymerization in the third reaction zone. The polymer was extruded and pelletized (about 30 pellets per gram), using a single screw extruder, at a melt temperature around 230-250° C. The weight ratio of the ethylene-rich feed streams to the three reaction zones was 1.00:0.80:0.20. The internal process velocity was approximately 12.5, 9 and 11 m/sec for respectively the $1^{st}$ $2^{nd}$ and $3^{rd}$ reaction zones.

The comparison of the C. Exs. 1'-9' shows that the applied polyene (PPG-AEMA) is effective in increasing G', by formation of intermolecular branches. Other polyenes, able in forming H-branches, can show a similar impact on G'; however the type and the activity of the functional groups can show secondary effects on process stability and/or fouling, gel formation, consumption level and gel level in polymer. The results show the importance of the distribution of the rheology modifier over the reaction zones, to achieve a good balance of high G' values and low Gel levels. The "GI-200 Gel-count" was measured on cast films, and provides an indication of the Gel levels in the final extrusion coating application; however due to significant higher temps and shear conditions in the extrusion coating process, the Gel levels in a coating would be significantly reduced, and thus, a coating formed from a modified ethylene-based polymer, described herein, would be comparable in appearance to a coating made from a conventional, unmodified ethylene-based polymer (e.g., AC-LDPE) with a similar density. The results of the iso-butane as CTA, with reduced CTA-activity at inlet of the reactor and/or in the first reaction zone, versus using propylene as CTA, shows the importance to reduce the CTA-activity at the inlet of the reactor and/or in the first reaction zone over the CTA-activity in subsequent reaction zones. Replacing iso-butane by propylene resulted in lower densities, higher extractable levels and less effective use of the rheology modifier, as shown by a higher consumption rate of the rheology modifier. See FIG. 9 for differences in G' values as fn of type of CTA and level of H-branches.

Figure 10:
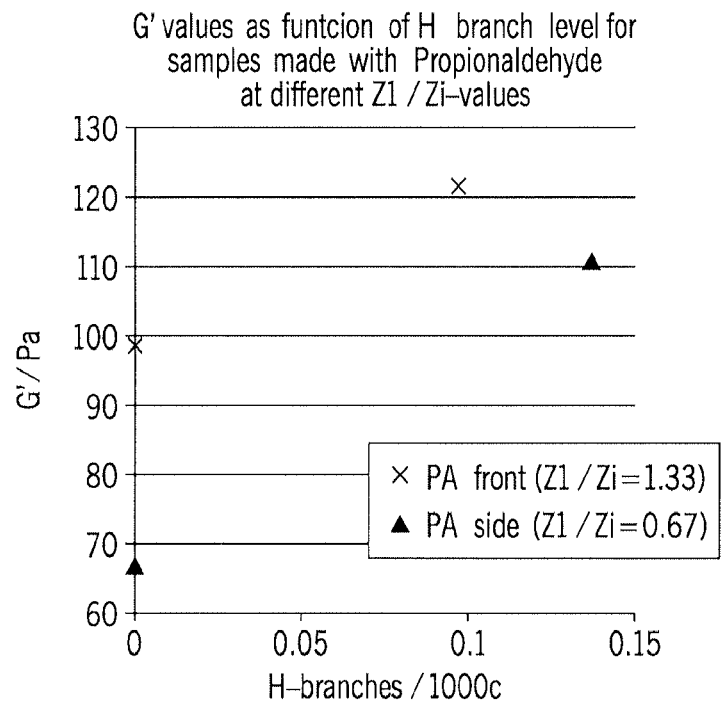
FIG. 10 is a graph showing G' values as function of H-branch level for different distributions of propionaldehyde.

Surprisingly, using PA as CTA and distributing its concentration and activity to the subsequent reaction zones, led to an effective use (high G' levels, low gel levels, and/or, in general, low consumption of the modifier) of the rheology modifier, and a high G' value. FIG. 10 shows the influence of H-branch level for polymers made with different distributions of PA CTA systems. Distributing the PA to the side of the reactor gives G' values, which are at least 20% higher vs. the commonly used distribution of PA to front of the reactor. The Gel level was visually lower, despite the higher initial molecular weight in the front of the reactor due to the applied distribution of propionaldehyde to the subsequent reaction zones. The impact of the distribution of CTA over the reactor is shown for propionaldehyde in FIG. 10. FIG. 10 shows that distributing the CTA more to the back of the reactor results in polymer with higher G' value, while distributing the CTA to the front of the reactor while result in polymer with lower G' value. It has been discovered that the formation of higher molecular weight in the beginning of the reactor, by the reduced CTA activity in the first reaction zone and the formation of higher molecular weight in the final polymer, as indicated by higher G' values, does not lead to highest but intermediate gel values. A higher G' value does not lead automatically to a higher gel level in the polymer. The final gel level is influenced by the starting (without branching agent) G' value for the polymer, the level of polyene needed to achieve desired G' level and the distribution of the H-branch formation in the polymer. The gel level is reduced by a higher G' number for the reference polymer without polyene, lower amount of polyene needed to reach the desired G' level, better distribution of the polyene over reaction zones and a better distribution of H-branch formation inter- and intra-polymer molecules. The incorporation of PPG-AEMA in the polymer for actual polymerizations was estimated through simulations. High G' values and low Gel levels are indicative of a better distribution of the rheology modifying agent in the final polymer. Information on simulated branching levels can be found in Table 10, which contains information on incorporation level of PPG-AEMA in the polymer, and the conversion level of PPG-AEMA fed to the reactor to the H-branch level in the Polymer (inter-plus intra-molecular H-branches).

Figure 9:
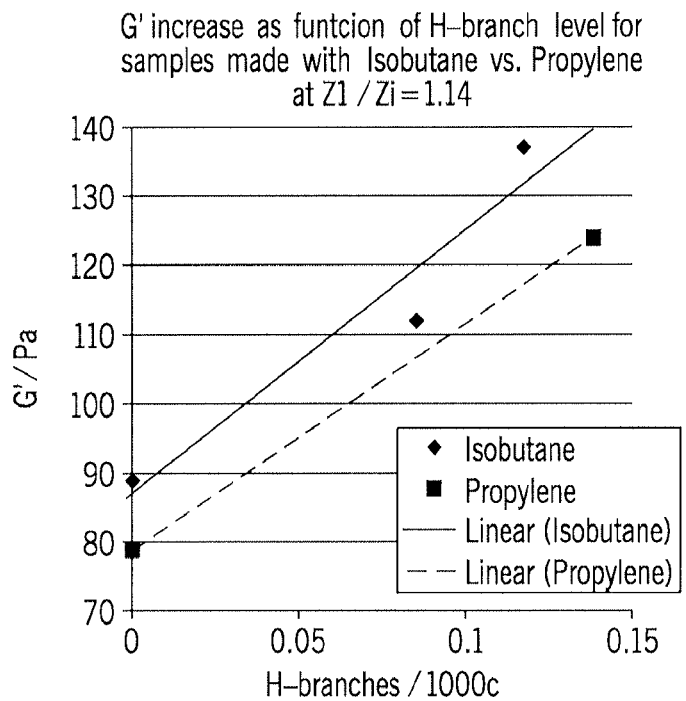
FIG. 9 is a graph showing G' values as function of H-branch level and type of CTA.

The G' values for the polymers made with isobutane or propylene are shown in FIG. 9 as function of simulated H-branch level. FIG. 9 shows that for the same CTA distribution along a reactor, isobutane is a more effective CTA for reaching G' values than propylene. Table 12 lists the G' values for a 4 MI polymer with a simulated H-branch level of 0.1/1000 C. This table shows clearly the advantage of the use of a low active CTA (Cs≤0.008) even at Z1/Zi values >1, while surprisingly higher active CTAs can be successfully used for reaching high G' values at Z1/Zi ratios ≤0.9. As shown in Table 11, the comp. ethylene-based polymers have significantly higher G' values, and these higher G' values indicate higher melt strengths for the inventive polymers. See also Table 10. Higher melt strength provides for improved extrusion coating properties, for example reduced neck-in (shrinkage of web as compared to the die width; for example see US 2012/0252990 (page 11)) and better web stability during the extrusion coating process. The examples using isobutane or propionaldehyde, as CTA (C.Exs. 1, 3 and 4), resulted in higher product densities, namely above 0.920 g/cc, and more specifically above 0.922 g/cc. The use of propylene, as CTA, resulted in product densities ≤0.920 g/cc.

TABLE 8

Pressure and Temperature Conditions (Actual Data)

| Type | Inlet pressure/bar | Start temp./° C. | reinitiation temp./° C. | reinitiation temp./° C. | 1st Peak temp./° C. | 2nd Peak temp./° C. | 3rd Peak temp./° C. |
|---|---|---|---|---|---|---|---|
| C. Ex. 1' | 2220 | 140 | 150 | 207 | 294 | 292 | 294 |
| C. Ex. 2' | 2150 | 145 | 152 | 196 | 293 | 293 | 293 |
| C. Ex. 3' | 2140 | 145 | 159 | 197 | 292 | 294 | 294 |
| C. Ex. 4' | 2220 | 144 | 148 | 211 | 293 | 293 | 293 |
| C. Ex. 5' | 2140 | 145 | 160 | 199 | 293 | 293 | 293 |
| C. Ex. 6' | 2220 | 140 | 148 | 213 | 294 | 293 | 294 |
| C. Ex. 7' | 2140 | 145 | 151 | 198 | 293 | 293 | 293 |
| C. Ex. 8' | 2155 | 145 | 148 | 217 | 293 | 293 | 294 |
| C. Ex. 9' | 2155 | 145 | 148 | 217 | 293 | 293 | 294 |

C. Ex. 1'-C. Ex. 9' are each an actual comparative example.

TABLE 9

Additional Information (Actual data)

| Ex. | PPG-AEMA flow (kg of diene per hour) ($1^{st}/2^{nd}/3^{rd}$ zone) | PPG-AEMA (mole ppm diene in ethylene-based feed stream in each reaction zone**) ($1^{st}/2^{nd}/3^{rd}$ zone) | CTA | Ratio CTA conc. 1st Rx-zone/last Rx-zone ($Z_1/Z_i$) | Ratio CTA conc. 1st Rx-zone/2nd Rx-zone | Total Hyper throughput ton per hour | Polymer output ton per hour* |
|---|---|---|---|---|---|---|---|
| C. Ex. 1' | 0/0/0 | 0/0/0 | Iso-butane | 1.14 | 1.14 | 54.2 | 15 |
| C. Ex. 2' | 0/0/0 | 0/0/0 | PA | 1.37 | 1.26 | 56.4 | 15.9 |
| C. Ex. 3' | | 0/0/0 | PA | 0.61 | 0.68 | 56.1 | 15.8 |
| C. Ex. 4' | 38/18/5 | 142/86/86 | Iso-butane | 1.14 | 1.14 | 54.2 | 14.9 |
| C. Ex. 5' | 10/37/25 | 34/219/219 | PA | 0.71 | 0.76 | 56.2 | 15.9 |
| C. Ex. 6' | 0/50/13 | 0/233/233 | Iso-butane | 1.14 | 1.14 | 54.2 | 14.9 |

TABLE 9-continued

Additional Information (Actual data)

| Ex. | PPG-AEMA flow (kg of diene per hour) ($1^{st}/2^{nd}/3^{rd}$ zone) | PPG-AEMA (mole ppm diene in ethylene-based feed stream in each reaction zone**) ($1^{st}/2^{nd}/3^{rd}$ zone) | CTA | Ratio CTA conc. 1st Rx-zone/last Rx-zone ($Z_1/Z_i$) | Ratio CTA conc. 1st Rx-zone/2nd Rx-zone | Total Hyper throughput ton per hour | Polymer output ton per hour* |
|---|---|---|---|---|---|---|---|
| C. Ex. 7' | 100/0/0 | 230/0/0 | PA | 1.37 | 1.25 | 56.3 | 15.8 |
| C. Ex. 8' | 0/0/0 | 0/0/0 | Propylene | 1.14 | 1.15 | 56.4 | 15.4 |
| C. Ex. 9' | 48/21/5 | 172/94/94 | Propylene | 1.14 | 1.14 | 56.4 | 15.5 |

*Polymer output was calculated from ethylene (#1), CTA (#22 and/or #23) and PPG-AEMA (#6 and/or #7) intakes corrected for process purge stream (#16).
**Ethylene-based feed stream in each reaction zone refers to the feed stream compressed and fed by the hyper, and containing a majority amount of ethylene (e.g., >80 wt % ethylene).
Other components, such as comonomer, CTA, peroxide dissociation products, solvent may be present.
C. Ex. 1'-C. Ex. 9' are each an actual comparative example.

TABLE 10

Simulated Results on Branching Levels and Conversions

| Ex. | SCB* #/1000 C | Methyl* #/1000 C | LCB* #/1000 C | PPG-AEMA conv.* % | Conversion to H-branch* % | H-branch level* #/1000 C |
|---|---|---|---|---|---|---|
| C. Ex. 1' | 26.5 | 0 | 3.74 | 0 | 0 | 0 |
| C. Ex. 2' | 25.1 | 0 | 3.69 | 0 | 0 | 0 |
| C. Ex. 3' | 25.5 | 0 | 3.74 | 0 | 0 | 0 |
| C. Ex. 4' | 25.7 | 0 | 3.62 | 98.2 | 57.6 | 0.117 |
| C. Ex. 5' | 25.1 | 0 | 3.64 | 94.7 | 42.9 | 0.097 |
| C. Ex. 6' | 25.8 | 0 | 3.66 | 95.4 | 42.7 | 0.085 |
| C. Ex. 7' | 24.8 | 0 | 3.56 | 99.9 | 67 | 0.137 |
| C. Ex. 8' | 25.8 | 4.7 | 3.68 | 0 | 0 | 0 |
| C. Ex. 9' | 25.5 | 2.2 | 3.67 | 98.1 | 57 | 0.138 |

C. Ex. 1'-E. Ex. 9' are each an actual comparative example.
*Results obtained via modeling using the kinetics in Tables 2-4.

TABLE 11

Polymer Properties

| Ex. | I2 g/dmin | Density g/cc | G' Pa | G' according Eqn. claim 3 Pa | GI-200 unit = $mm^2$ Gel per 24.6 $cm^3$ of film see above |
|---|---|---|---|---|---|
| C. Ex. 1' | 4 | 0.9243 | 89 | 112.8 | 0.7 |
| C. Ex. 2' | 4.36 | | 67 | 109.4 | |
| C. Ex. 3' | 4.14 | | 99 | 111.5 | |
| C. Ex. 4' | 3.9 | 0.9248 | 137 | 113.8 | 22.7 |
| C. Ex. 5' | 3.8 | 0.9258 | 122 | 114.8 | 1.0 |
| C. Ex. 6' | 3.7 | 0.9243 | 112 | 115.9 | 56* |
| C. Ex. 7' | 3.8 | | 111 | 114.8 | |
| C. Ex. 8' | 4.28 | | 79 | 110.2 | |
| C. Ex. 9' | 4.1 | 0.9204 | 124 | 111.8 | |

*Average of two cast film runs.
C. Ex. 1'-C. Ex. 9' are each an actual comparative example.

TABLE 12

Estimate of CTA type and/or distribution on G' values for 4 MI LDPE with a simulated H-branch level of 0.1/1000 C

| CTA | Cs at 130° C., 1360 atm | Z1/Zi | G' at H branch level of 0.1/1000 C Pa | G' according eqn claim 3 Pa |
|---|---|---|---|---|
| Isobutane | 0.0072 | 1.14 | Approx. 125 | 112.8 |
| Propylene | 0.0122 | 1.14 | Approx. 110 | 112.8 |
| PA | 0.33 | 0.67 | Approx. 125 | 112.8 |
| PA | 0.33 | 1.33 | Approx. 100 | 112.8 |

The invention claimed is:

1. A process to form an ethylene-based polymer, said process comprising polymerizing a reaction mixture comprising ethylene, at least one symmetrical polyene and at least one chain transfer agent system comprising at least one chain transfer agent (CTA); and wherein the polymerization takes place in the presence of at least one free-radical initiator; and wherein the polymerization takes place in a reactor configuration comprising at least two reaction zones, reaction zone 1 and reaction zone i (i≥2), wherein reaction zone i is downstream from reaction zone 1; and wherein the process comprises at least one of the following:
(A) a ratio of "the activity of the CTA system of the feed to the first reaction zone" to the "activity of the CTA system of the cumulative feed to the reaction zone i," ($Z_1/Z_i$), is less than or equal to (0.8−0.2*log(Cs)), wherein Cs is from 0.0001 to 10; or (B) the ratio of activity of the CTA system of the feed to the first reaction zone to the activity of the CTA system of the cumulative feed to the reaction zone i, $(Z_1/Z_i)$, is less than, or equal to, 0.90.

2. The process of claim 1, wherein the ethylene-based polymer has a G' value that meets the following relationship: $G' \geq C + D \log(I_2)$, where C=167 Pa, and D=−90.0 Pa/log(dg/min), and a melt index (I2) from 1 to 20 g/10 min.

3. The process of claim 1, wherein the reaction mixture further comprises at least one asymmetrical polyene.

4. The process of claim 3, wherein the symmetrical polyene is selected from structure i), structure iii) wherein $R_{13}=R_{14}$, structure iv) wherein $R_{15}=R_{18}$, structure v) wherein $R_{19}=R_{24}$, or structure vi); and wherein the asymmetrical polyene is selected from structure ii), structure iii) wherein $R_{13} \neq R_{14}$, structure iv) wherein $R_{15} \neq R_{18}$, structure v) wherein $R_{19} \neq R_{24}$, or structure vii), wherein structures i) through vii) are as follows:

i)

wherein t is from 2 to 20;

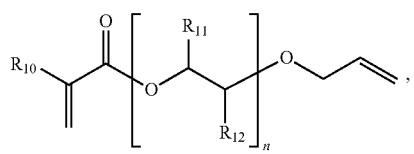
ii)

wherein, $R_{10}$, $R_{11}$ and $R_{12}$ are each independently selected form H or an alkyl, and n is from 1 to 50;

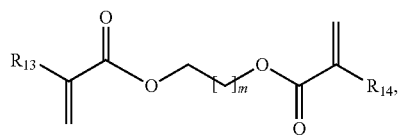
iii)

wherein $R_{13}$ and $R_{14}$ are each independently selected form H or an alkyl, and m is from 1 to 50;

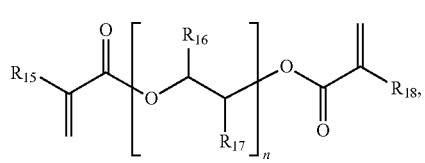
iv)

wherein $R_{15}$, $R_{16}$, $R_{17}$ and $R_{18}$ are each independently selected form H or an alkyl, and p is from 1 to 50;

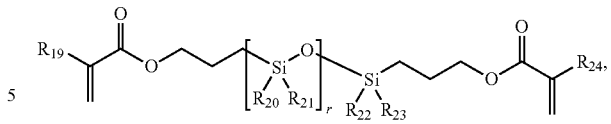

wherein $R_{19}$, $R_{20}$, $R_{21}$, $R_{22}$, $R_{23}$ and $R_{24}$ are each independently selected form H or an alkyl, and r is from 1 to 1000;

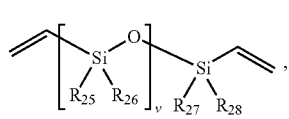
vi)

wherein $R_{25}$, $R_{26}$, $R_{27}$ and $R_{28}$ are each independently selected form H or an alkyl, and v is from 1 to 1000; and

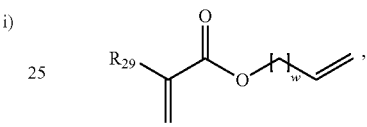
vii)

wherein $R_{29}$ is H or an alkyl and w is from 1 to 20.

5. The process of claim 4, wherein the symmetrical polyene is selected from the group consisting of structure i) and structure iii) wherein $R_{13}=R_{14}$, and wherein the asymmetrical polyene is selected from the group consisting of structures ii) and iii) wherein $R_{13} \neq R_{14}$.

6. The process of claim 1, wherein the symmetrical polyene is

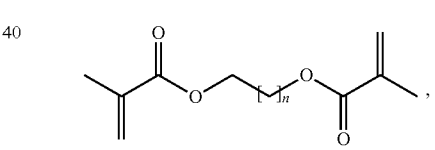
(d)

wherein n is from 1 to 50.

7. The process of claim 1, wherein the symmetrical polyene is

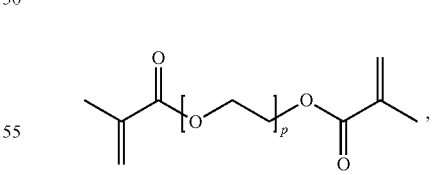
f)

wherein p is from 1 to 50.

8. The process of claim 1, wherein the ethylene-based polymer further comprises one or more comonomers selected from α-olefins, vinyl acetates, acrylates, methacrylates, anhydrides and vinyl silanes, or combinations thereof.

9. The process of claim 1 wherein the process comprises
(A) the ratio of "the activity of the CTA system of the feed to the first reaction zone" to the "activity of the CTA system of the cumulative feed to the reaction zone i,"

$(Z_1/Z_i)$, is less than or equal to $(0.8-0.2*\log(Cs))$, wherein Cs is from 0.0001 to 10.

10. The process of claim 9 wherein the CTA comprises propionaldehyde.

11. The process of claim 9 wherein the CTA comprises propylene.

12. The process of claim 1 wherein the process comprises
B) the ratio of activity of the CTA system of the feed to the first reaction zone to the activity of the CTA system of the cumulative feed to the reaction zone i, $(Z_1/Z_i)$, is less than, or equal to, 0.90.

13. The process of claim 12 wherein the CTA comprises propionaldehyde.

14. The process of claim 12 wherein the CTA comprises propylene.

* * * * *